US012592196B1

(12) United States Patent
Huang et al.

(10) Patent No.: US 12,592,196 B1
(45) Date of Patent: Mar. 31, 2026

(54) PIXEL CIRCUITS FOR LIGHT EMITTING ELEMENTS

(71) Applicant: Kunshan Yunyinggu Electronic Technology Co., Ltd., Kunshan (CN)

(72) Inventors: Juin-Wei Huang, Kunshan (CN); Yu-Hsun Peng, Kunshan (CN); Kuan-Hua Chen, Kunshan (CN); Yu-Kuang Chang, Kunshan (CN)

(73) Assignee: Kunshan Yunyinggu Electronic Technology Co., Ltd., Kunshan (CN)

( * ) Notice: Subject to any disclaimer, the term of this patent is extended or adjusted under 35 U.S.C. 154(b) by 3 days.

(21) Appl. No.: 18/903,074

(22) Filed: Oct. 1, 2024

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2310/08* (2013.01); *G09G 2330/021* (2013.01)

(58) Field of Classification Search
CPC ......... G09G 3/3233; G09G 2300/0819; G09G 2300/0852; G09G 2310/08; G09G 2330/021
See application file for complete search history.

(56) References Cited

U.S. PATENT DOCUMENTS

| | | | | |
|---|---|---|---|---|
| 2015/0371590 A1* | 12/2015 | Jeong | G09G 3/3291 | 345/82 |
| 2023/0215353 A1* | 7/2023 | Zhang | G09G 3/3233 | 345/204 |
| 2025/0046247 A1* | 2/2025 | Cao | G09G 3/3233 | |

* cited by examiner

*Primary Examiner* — Stacy Khoo
(74) *Attorney, Agent, or Firm* — Bayes PLLC

(57) ABSTRACT

A pixel driving circuit includes a driving circuit, a data writing circuit, and a compensation and driving circuit. The driving circuit includes a driving transistor having a gate terminal, a source terminal, and a drain terminal. The data writing circuit is coupled to a first bias source and a data line and is configured to selectively provide a first initialization bias signal to the driving circuit during an initialization period and provide the data signal to the driving circuit during a data writing period. The compensation and driving circuit is coupled to a second bias source and is configured to selectively provide a second initialization bias signal to the driving circuit during the initialization period and provide a driving bias signal during an emitting period. The light emitting element is disconnected from the second initialization bias signal during the initialization period and the data writing period.

22 Claims, 22 Drawing Sheets

400

100

300

600

1000

1400

1800

2000

PIXEL CIRCUITS FOR LIGHT EMITTING ELEMENTS

BACKGROUND

The disclosure relates generally to display technologies, and more particularly, to pixel circuits.

The conventional pixel circuits for driving the light emitting elements may have some high-power consumption issues. For example, when the same data is written to two consecutive lines, even though the data is the same, the data lines have to be switched to write the data difference (ΔV) and, therefore, cause unnecessary power consumption. In addition, when performing the initialization function of the driving circuit, the operation also causes additional power consumption between power sources from drain supply voltage Vdd to source supply voltage Vss.

SUMMARY

In one aspect, a pixel driving circuit is disclosed. The pixel driving circuit includes a driving circuit, a data writing circuit, and a compensation and driving circuit. The driving circuit is configured to drive a light emitting element based on a data signal. The driving circuit includes a driving transistor having a gate terminal, a source terminal, and a drain terminal. The data writing circuit is coupled to a first bias source and a data line and is configured to selectively provide a first initialization bias signal to the driving circuit during an initialization period and provide the data signal to the driving circuit during a data writing period. The compensation and driving circuit is coupled to a second bias source and is configured to selectively provide a second initialization bias signal to the driving circuit during the initialization period and provide a driving bias signal during an emitting period. The light emitting element is disconnected from the second initialization bias signal during the initialization period and the data writing period.

In some implementations, the pixel driving circuit further includes a first capacitor disposed between the compensation and driving circuit and the gate terminal of the driving transistor.

In some implementations, the data writing circuit is coupled to the gate terminal of the driving transistor.

In some implementations, the data writing circuit includes a first switch coupled between the first bias source and the gate terminal of the driving transistor, and a second switch coupled between the data line and the gate terminal of the driving transistor.

In some implementations, the first bias source and the data line are integrated into an integrated data line, and the first initialization bias signal and the data signal are provided through the integrated data line separately in different operation periods.

In some implementations, the data writing circuit includes a third switch coupled between the integrated data line and the gate terminal of the driving transistor.

In some implementations, the driving circuit includes a fourth switch coupled between the source terminal of the driving transistor and the compensation and driving circuit.

In some implementations, the driving circuit includes a fifth switch coupled between the drain terminal of the driving transistor and the light emitting element.

In some implementations, the compensation and driving circuit is coupled to the gate terminal and the source terminal of the driving transistor.

In some implementations, the compensation and driving circuit includes a sixth switch coupled between the second bias source and the driving circuit and a seventh switch coupled between an adjacent pixel circuit and the driving circuit.

In some implementations, the compensation and driving circuit includes an eighth switch coupled between the second bias source and the driving circuit and a second capacitor coupled between the second bias source and the driving circuit.

In some implementations, the pixel driving circuit further includes a ninth switch coupled between the drain terminal of the driving transistor and a reset bias source.

In another aspect, a display is disclosed. The display includes a light emitting element, a driving circuit, a data writing circuit, and a compensation and driving circuit. The driving circuit is configured to drive a light emitting element based on a data signal. The driving circuit includes a driving transistor having a gate terminal, a source terminal, and a drain terminal. The data writing circuit is coupled to a first bias source and a data line and is configured to selectively provide a first initialization bias signal to the driving circuit during an initialization period and provide the data signal to the driving circuit during a data writing period. The compensation and driving circuit is coupled to a second bias source and is configured to selectively provide a second initialization bias signal to the driving circuit during the initialization period and provide a driving bias signal during an emitting period. The light emitting element is disconnected from the second initialization bias signal during the initialization period and the data writing period.

In a further aspect, a method for driving a light emitting element by a pixel circuit is disclosed. The pixel circuit includes a driving circuit, a data writing circuit, and a compensation and driving circuit. The driving circuit includes a driving transistor. The data writing circuit is coupled to a first bias source, a data line, and a gate terminal of the driving transistor. The compensation and driving circuit is coupled to a second bias source and a source terminal of the driving transistor. A first capacitor is disposed between the compensation and driving circuit and the gate terminal of the driving transistor. During an initialization period, a first bias source is coupled to a first end of the first capacitor and a second bias source is coupled to a second end of the first capacitor. During a compensation period, the second end of the first capacitor is coupled with the source terminal of the driving transistor. During a data writing period, the data line is coupled to the first end of the first capacitor. During an emitting period, the source terminal of the driving transistor is coupled to the second bias source.

In some implementations, during the initialization period, a first bias source is coupled to a first end of the first capacitor, a second bias source is coupled to a second end of the first capacitor, and the second end of the first capacitor is coupled to an adjacent pixel circuit.

In some implementations, during the compensation period, the second end of the first capacitor is coupled with the source terminal of the driving transistor, the first bias source is disconnected from the first end of the first capacitor, and the second bias source is disconnected from the second end of the first capacitor.

In some implementations, during the data writing period, the data line is coupled to the first end of the first capacitor, and the second end of the first capacitor is disconnected from the source terminal of the driving transistor.

In some implementations, during the emitting period, the source terminal of the driving transistor is coupled to the second bias source, and the data line is disconnected from the first end of the first capacitor.

In some implementations, a sum of the initialization period, the compensation period, the data writing period, and the emitting period is a frame period.

In some implementations, during the initialization period, a reset bias source is coupled to the light emitting element, and during the emitting period, the reset bias source is disconnected from the light emitting element.

In a further aspect, a method for driving a light emitting element by a pixel circuit is disclosed. The pixel circuit includes a driving circuit, a data writing circuit, and a compensation and driving circuit. The driving circuit includes a driving transistor. The data writing circuit is coupled to a first bias source, a data line, and a gate terminal of the driving transistor. The compensation and driving circuit is coupled to a second bias source and a source terminal of the driving transistor. A first capacitor is disposed between the compensation and driving circuit and the gate terminal of the driving transistor. During an initialization period, a first bias source is coupled to a first end of the first capacitor and a second bias source is coupled to a second end of the first capacitor. During a compensation period, a drain terminal of the driving transistor is coupled to the light emitting element. During a data writing period, the data line is coupled to the first end of the first capacitor. During an emitting period, the source terminal of the driving transistor is coupled to the second bias source.

In some implementations, during the initialization period, a first bias source is coupled to a first end of the first capacitor, a second bias source is coupled to a second end of the first capacitor, and the second end of the first capacitor is coupled to an adjacent pixel circuit.

In some implementations, during the compensation period, a drain terminal of the driving transistor is coupled to the light emitting element, the first bias source is disconnected from the first end of the first capacitor, and the second bias source is disconnected from the second end of the first capacitor.

In some implementations, during the data writing period, the data line is coupled to the first end of the first capacitor, and the drain terminal of the driving transistor is disconnected from the light emitting element.

In some implementations, during the emitting period, the source terminal of the driving transistor is coupled to the second bias source, and the data line is disconnected from the first end of the first capacitor.

In some implementations, during the emitting period, the drain terminal of the driving transistor is coupled to the light emitting element.

In some implementations, a sum of the initialization period, the compensation period, the data writing period, and the emitting period is a frame period.

In some implementations, during the initialization period, a reset bias source is coupled to the light emitting element, and during the emitting period, the reset bias source is disconnected from the light emitting element.

BRIEF DESCRIPTION OF THE DRAWINGS

The accompanying drawings, which are incorporated herein and form part of the specification, illustrate the presented disclosure and, together with the description, further serve to explain the principles of the disclosure and enable a person of skill in the relevant art(s) to make and use the disclosure.

The present disclosure will be described with reference to the accompanying drawings.

DETAILED DESCRIPTION

Although specific configurations and arrangements are discussed, it should be understood that this is done for illustrative purposes only. It is contemplated that other configurations and arrangements can be used without departing from the spirit and scope of the present disclosure. It is further contemplated that the present disclosure can also be employed in a variety of other applications.

It is noted that references in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it is contemplated that such feature, structure or characteristic may also be used in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

As will be disclosed in detail below, among other novel features, the pixel circuits for light emitting elements, such as organic light emitting elements (OLEDs) and micro-LEDs, disclosed herein can improve a variety of display specifications. It is understood that the light emitting elements described here are for illustration only and other types of light emitting elements could also be applied.

Figure 1:
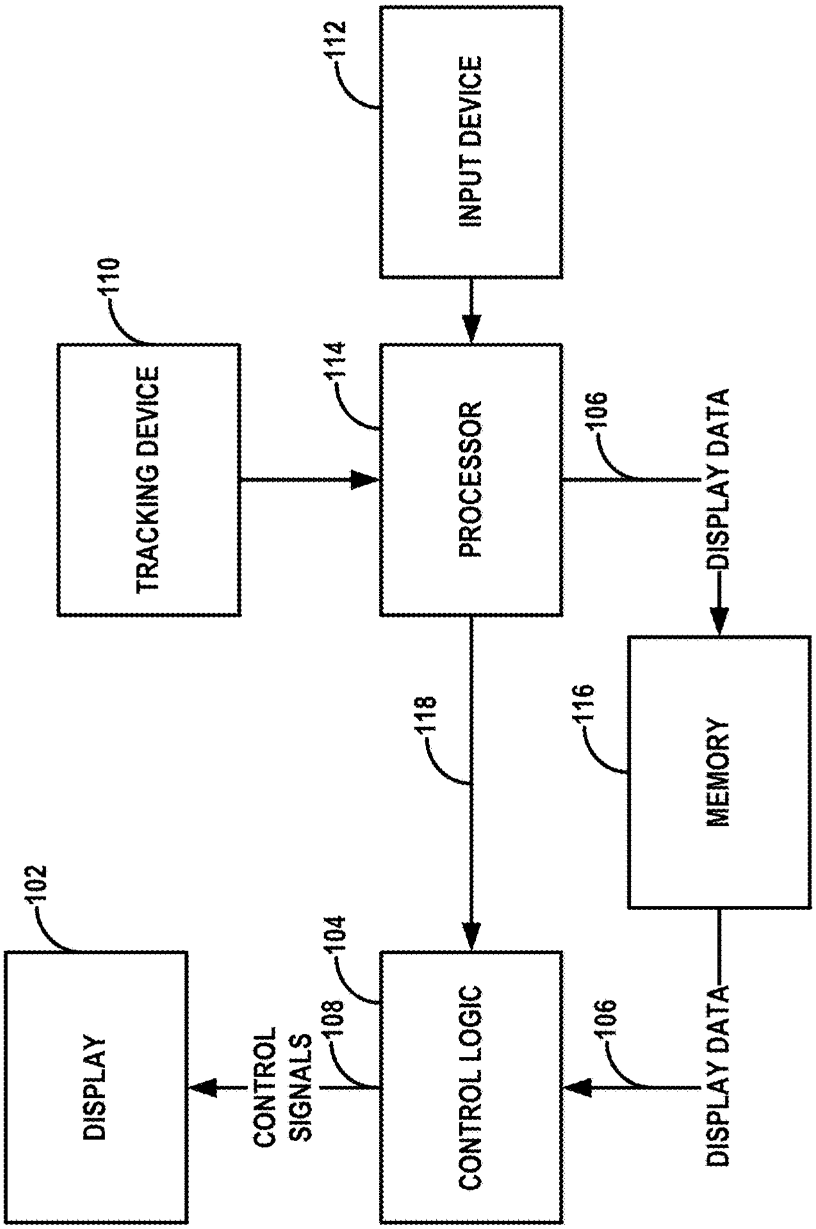
FIG. 1 illustrates an apparatus including a display and control logic, according to some aspects of the present disclosure.

FIG. 1 illustrates an apparatus 100 including a display 102 and control logic 104, according to some aspects of the present disclosure. Apparatus 100 may be any suitable device, for example, a VR, AR, or MR device (e.g., VR headset, etc.), handheld device (e.g., dumb or smart phone, tablet, etc.), wearable device (e.g., eyeglasses, wrist watch, etc.), automobile control station, gaming console, television set, laptop computer, desktop computer, netbook computer, media center, set-top box, global positioning system (GPS), electronic billboard, electronic sign, printer, or any other suitable device. In some implementations, display 102 is operatively coupled to control logic 104 and is part of apparatus 100, such as but not limited to, an HMD, handheld device screen, computer monitor, television screen, dashboard, electronic billboard, or electronic sign. Display 102 may be an OLED display, micro-LED display, liquid crystal display (LCD), E-ink display, electroluminescent display (ELD), billboard display with LED or incandescent lamps, or any other suitable type of display.

Control logic 104 may be any suitable hardware, software, firmware, or combination thereof, configured to receive display data 106 (e.g., pixel data) and generate control signals 108 for driving the subpixels on display 102. Control signals 108 are used for controlling writing of display data 106 to the subpixels and directing operations of display 102. For example, subpixel rendering (SPR) algorithms for various subpixel arrangements may be part of control logic 104 or implemented by control logic 104. Control logic 104 may be implemented as a standalone integrated circuit (IC) chip, such as an application-specific integrated circuit (ASIC) or a field-programmable gate array (FPGA). Apparatus 100 may also include any other suitable components, such as, but not limited to tracking devices 110 (e.g., inertial sensors, camera, eye tracker, GPS receiver, or any other suitable devices for tracking motion of eyeballs, facial expression, head movement, body movement, and hand gesture), input devices 112 (e.g., a mouse, keyboard, remote controller, handwriting device, microphone, scanner, etc.), and speakers (not shown).

In some implementations, apparatus 100 may be a handheld or a VR/AR/MR device, such as a smart phone, a tablet, or a VR headset. Apparatus 100 may also include a processor 114 and memory 116. Processor 114 may be, for example, a graphics processor (e.g., graphics processing unit (GPU)), an application processor (AP), a general processor (e.g., APU, accelerated processing unit; GPGPU, general-purpose computing on GPU), or any other suitable processor. Memory 116 may be, for example, a discrete frame buffer or a unified memory. Processor 114 is configured to generate display data 106 in display frames and may temporally store display data 106 in memory 116 before sending it to control logic 104. Processor 114 may also generate other data, such as but not limited to, control instructions 118 or test signals, and provide them to control logic 104 directly or through memory 116. Control logic 104 then receives display data 106 from memory 116 or from processor 114 directly.

Figure 2:
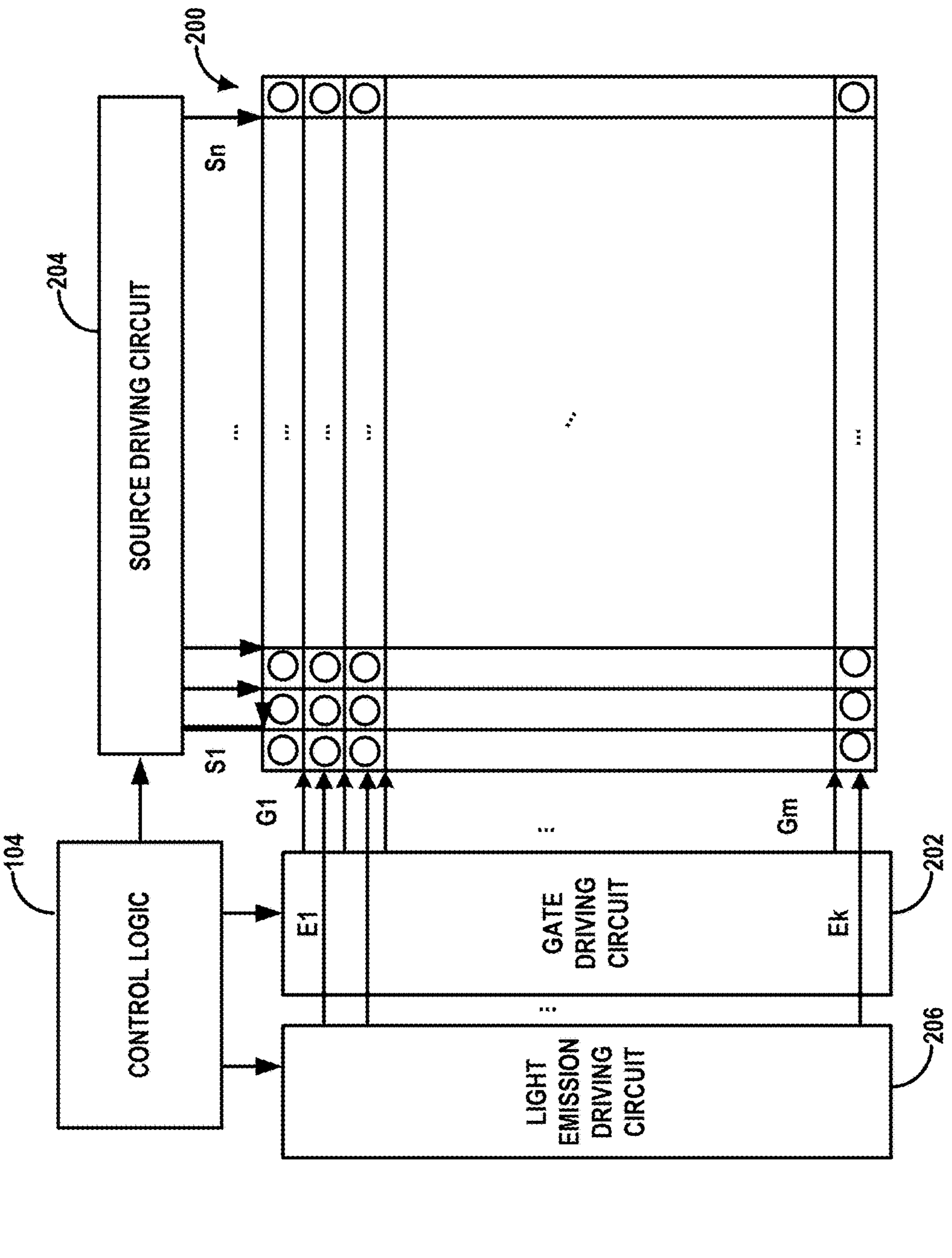
FIG. 2 illustrates a block diagram of the display shown in FIG. 1, according to some aspects of the present disclosure.

FIG. 2 illustrates a block diagram of display 102 shown in FIG. 1 including driving circuits, according to some aspects of the present disclosure. In some implementations, display 102 may include a display panel having an active region 200 including a plurality of subpixels. The display panel may also include on-panel driving circuits, e.g., a gate driving circuit 202 and a source driving circuit 204. It is to be appreciated that in some implementations, gate driving circuit 202 and source driving circuit 204 may not be on-panel driving circuits, i.e., not parts of the display panel, but instead are operatively coupled to the display panel.

Each subpixel may be any of the units that make up a pixel, i.e., a subdivision of a pixel. For example, a subpixel may be a single-color display element that can be individually addressed. In some implementations in which display 102 is a light emitting element display (e.g., an OLED display or a micro-LED display), each subpixel may include a light emitting element (e.g., an OLED or a micro-LED) and a pixel circuit for driving the light emitting element. The plurality of subpixels (and the light emitting elements thereof) may be arranged in an array having a plurality of rows and columns according to any suitable subpixel arrangement. Each light emitting element can emit light in a predetermined brightness and color, such as but not limited to, red, green, blue, yellow, cyan, magenta, or white. Each pixel circuit includes thin film transistors (TFTs) and capacitor(s) and is configured to drive the corresponding subpixel by controlling the light emitting from the respective light emitting element according to control signals 108 from control logic 104. The pixel circuit may be in a 2T1C configuration (i.e., including a switching transistor, a driving transistor, and a storage capacitor) or may include a compensation circuit with more transistors and/or capacitors for brightness uniformity, such as in a 7T1C, 5T1C, 5T2C, or 6T1C configuration.

In some implementations, gate driving circuit 202 is operatively coupled to active region 200 via a plurality of gate lines G1-Gm (a.k.a. scan lines) and configured to scan the plurality of subpixels. For example, gate driving circuit 202 applies a plurality of scan signals, which are generated based on control signals 108 from control logic 104, to the plurality of gate lines G1-Gm for scanning the plurality of subpixels in a gate scanning order. A scan signal is applied to the gate electrode of a switching transistor of each pixel circuit during the scan period to turn on the switching transistor so that the data signal for the corresponding subpixel can be written by source driving circuit 204. It is to be appreciated that although one gate driving circuit 202 is illustrated in FIG. 2, in some embodiments, multiple gate driving circuits may work in conjunction with each other to scan the subpixels.

In some implementations, source driving circuit 204 is operatively coupled to active region 200 via a plurality of source lines S1-Sn (a.k.a. data lines) and configured to write display data 106 in frames to the plurality of subpixels. For example, source driving circuit 204 may simultaneously apply a plurality of data signals to the plurality of source lines S1-Sn for the subpixels. That is, source driving circuit 204 may include one or more shift registers, digital-analog converters (DAC), multiplexers (MUX), and arithmetic circuit for controlling a timing of application of voltage to the source electrode of the switching transistor of each pixel circuit (i.e., during the scan period in each frame) and a magnitude of the applied voltage according to gradations of display data 106. It is to be appreciated that although one source driving circuit 204 is illustrated in FIG. 2, in some implementations, multiple source driving circuits may work in conjunction with each other to apply the data signals to the source lines for the subpixels.

Additionally, a light emission driving circuit 206 may be included on the display panel. Light emission driving circuit 206 may be operatively coupled to active region 200 and configured to cause each subpixel to emit light for a certain time period in each frame by applying a plurality of light emission signals to a plurality of emission lines E1-Ek. It is to be appreciated that although one light emission driving circuit 206 is illustrated in FIG. 2, in some implementations, multiple light emission driving circuits may work in conjunction with each other.

Figure 3:
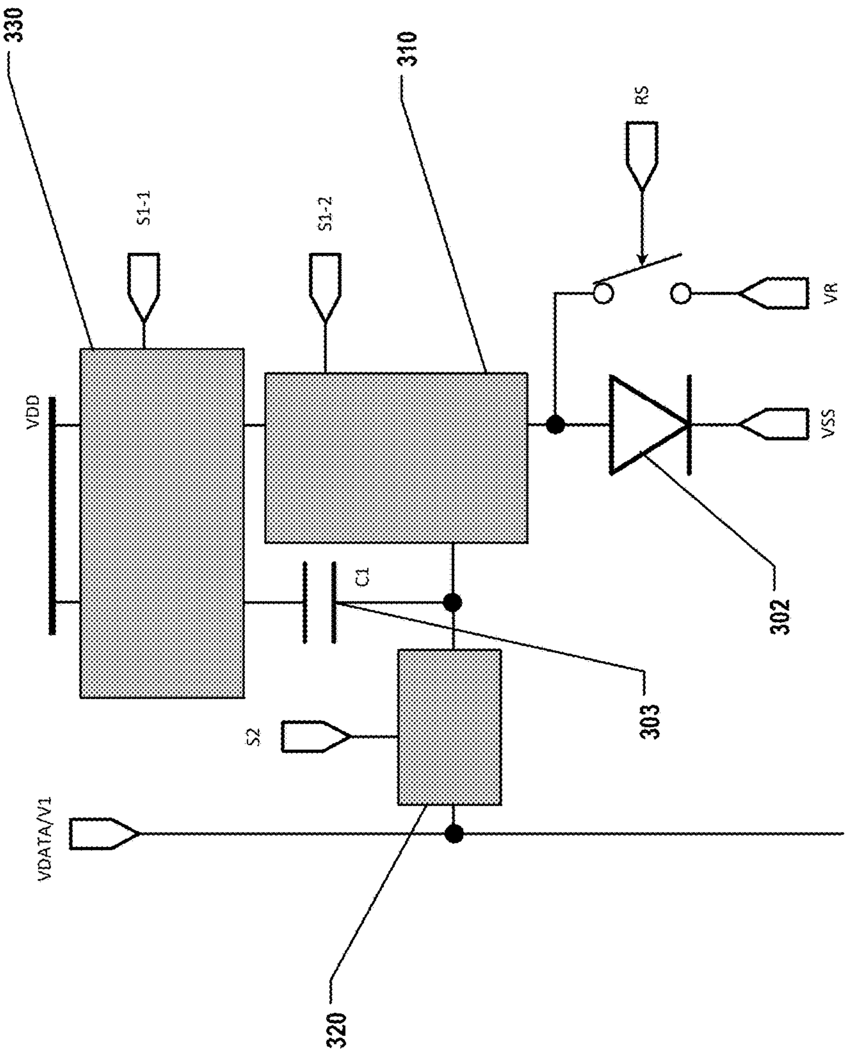
FIG. 3 illustrates a circuit diagram of a pixel driving circuit for a light emitting element, according to some aspects of the present disclosure.

FIG. 3 illustrates a circuit diagram of a pixel driving circuit 300 for a light emitting element 302, according to some aspects of the present disclosure. As shown in FIG. 3, pixel driving circuit 300 includes a driving circuit 310, a data writing circuit 320, and a compensation and driving circuit 330.

The driving circuit 310 is configured to drive the light emitting element 302 based on a data signal. The data writing circuit 320 is coupled to a first bias source (providing V1) and a data line (providing VDATA) and is configured to selectively provide a first initialization bias signal V1 to the driving circuit 310 during an initialization period and provide the data signal VDATA to the driving circuit during 310 a data writing period. The compensation and driving circuit 330 is coupled to a second bias source (providing VDD) and is configured to selectively provide a second initialization bias signal VDD to the driving circuit 310 during the initialization period and provide a driving bias signal VDD during an emitting period. In some implementations, the second initialization bias signal and the driving bias signal may be both provided by the second bias source and both have the bias voltage VDD. In some implementations, the second initialization bias signal and the driving bias signal may have different bias voltages.

In some implementations, a capacitor 303 (C1) is provided between the driving circuit 310, the data writing circuit 320, and the compensation and driving circuit 330. As shown in FIG. 3, a first end of the capacitor 303 is coupled to the driving circuit 310 and the data writing circuit 320, and a second end of the capacitor 303 is coupled to the compensation and driving circuit 330.

In some implementations, a scan period of each display frame may include a reset period and an emitting period, and the compensation and driving circuit 330 provides the bias signal VDD to the driving circuit 310 during the emitting period to drive the light emitting element 302. In some implementations, the reset period may include the initialization period, the compensation period, and the data writing period. The operation of the initialization period, the compensation period, the data writing period, and the emitting period will be further explained later.

Figure 4:
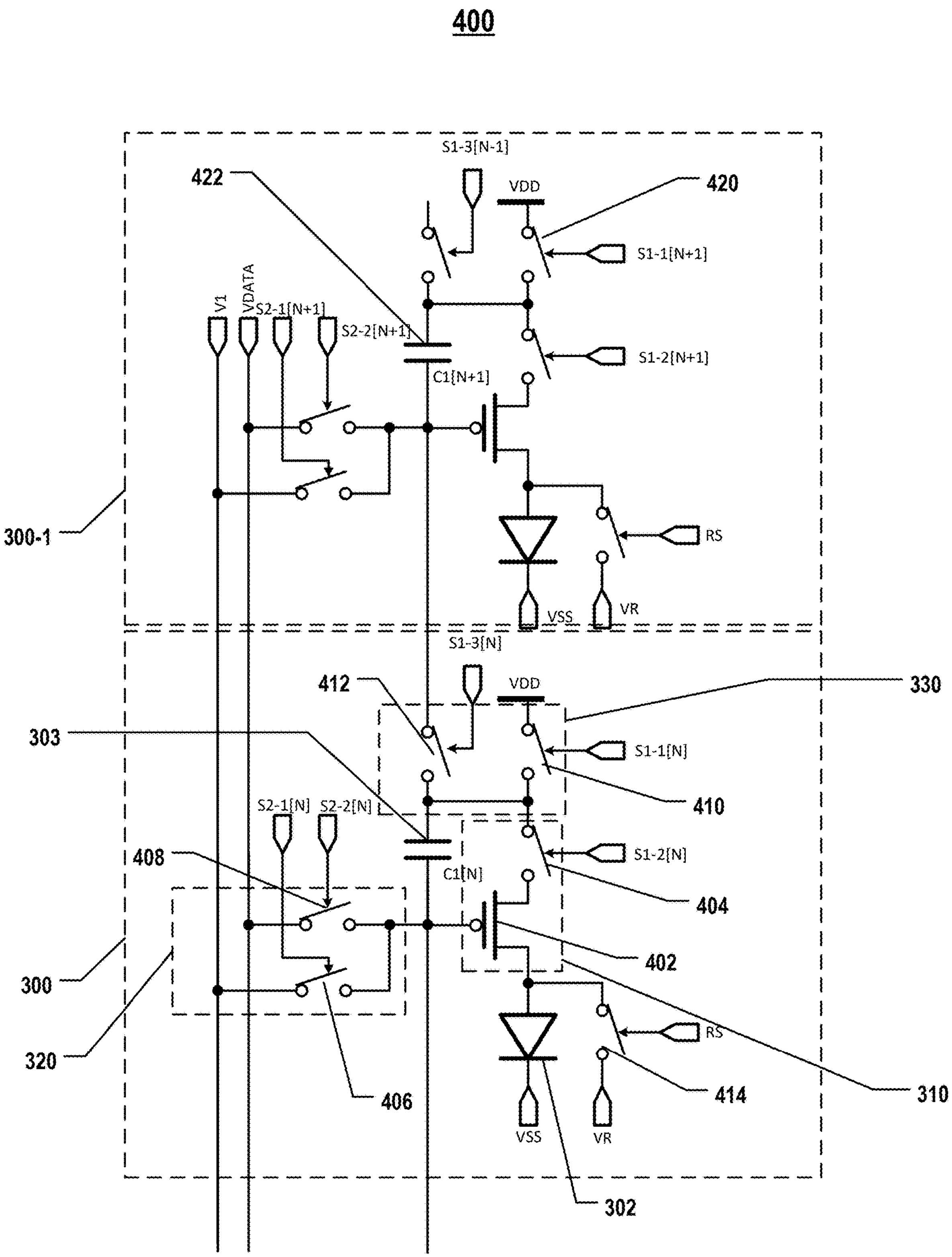
FIG. 4 illustrates a circuit diagram of a pixel driving circuit for a light emitting element, according to some aspects of the present disclosure.
Figure 5:
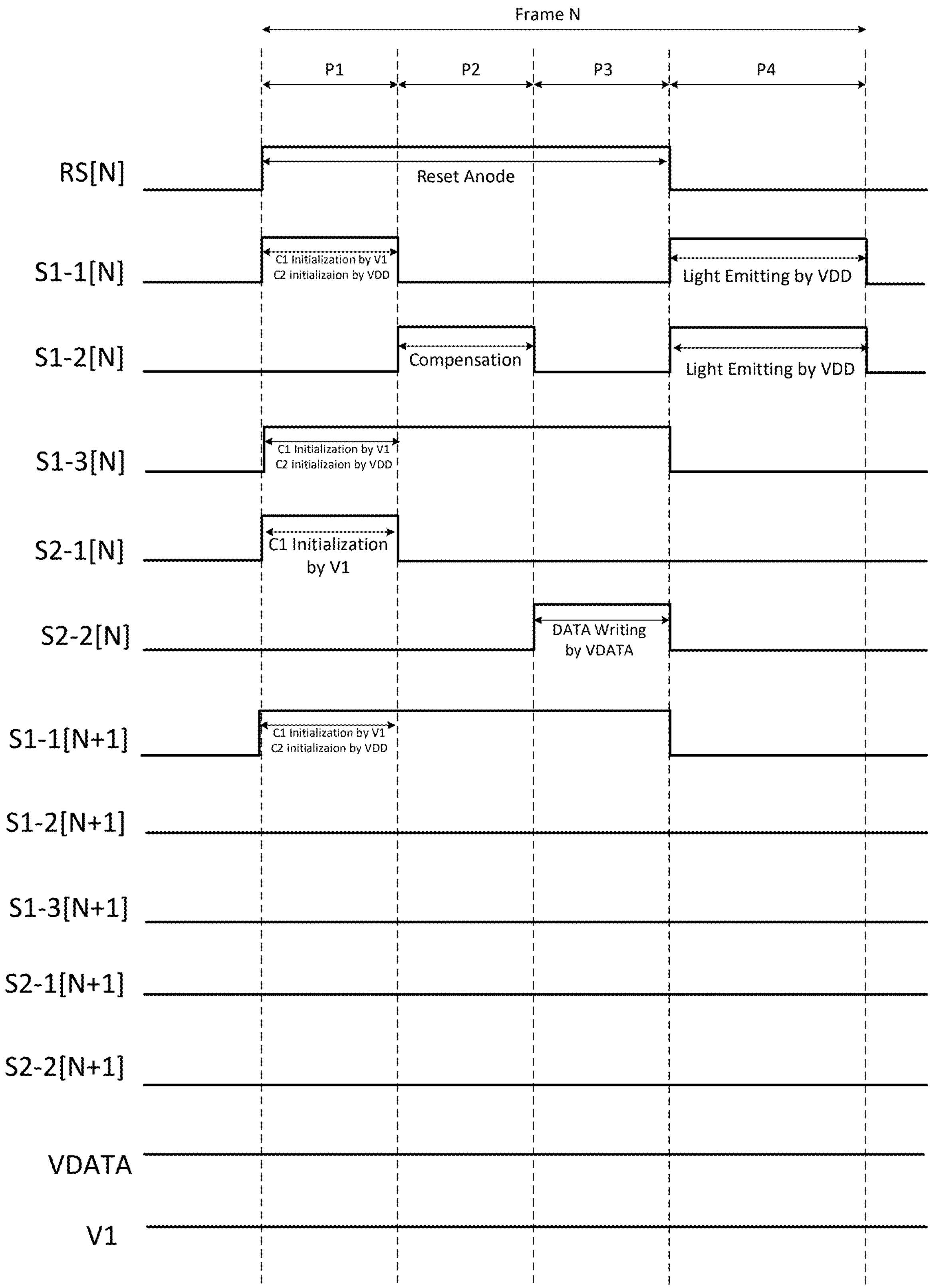
FIG. 5 illustrates a timing diagram showing the operations of the pixel driving circuit in FIG. 4, according to some aspects of the present disclosure.

FIG. 4 illustrates a circuit diagram of a pixel driving circuit 400, including the pixel driving circuit 300 and an adjacent pixel driving circuit 300-1, for the light emitting element 302, according to some aspects of the present disclosure. FIG. 5 illustrates a timing diagram showing the operations of the pixel driving circuit 400 in FIG. 4, according to some aspects of the present disclosure. For the purpose of better describing the present disclosure, the pixel driving circuit 400 in FIG. 4 and the timing diagram in FIG. 5 will be discussed together.

As shown in FIG. 4, the driving circuit 310 includes a driving transistor 402 having a gate terminal, a source terminal, and a drain terminal. The driving circuit 310 further includes a switch 404 located between the source terminal of the driving transistor 402 and the compensation and driving circuit 330. The data writing circuit 320 may include a switch 406 and a switch 408. The compensation and driving circuit 330 may include a switch 410 and a switch 412.

The drain terminal of the driving transistor 402 is coupled to the light emitting element 302, the gate terminal of the driving transistor 402 is coupled to the first end of the capacitor 303, and the source terminal of the driving transistor 402 is coupled to the switch 404. The other end of the switch 404 is coupled to the switch 410, the switch 412, and the second end of the capacitor 303. The switch 410 is coupled to the second bias source (providing VDD). The switch 412 is coupled to the capacitor of the adjacent pixel driving circuit 300-1 for charge sharing. The switch 406 is coupled between the first end of the capacitor 303 and the first bias source (providing the first initialization bias signal V1). The switch 408 is coupled between the first end of the capacitor 303 and the data line (providing the data signal VDATA). The pixel driving circuit 300 further includes a reset bias source VR and a switch 414 coupled between the reset bias source VR and the anode of the light emitting element 302.

In some implementations, when driving the display panel with the driving circuit, the source driving circuit may provide the display data, e.g., data signal VDATA, via a plurality of source lines in frames to the plurality of subpixels, e.g., light emitting element 302. In some implementations, the operation of the switching of data signal VDATA may be controlled by providing the switching signals S2-1, S2-2 . . . to the data writing circuit 320. Additionally, the compensation and driving circuit 330 may be operatively coupled to the light emitting element 302 through the driving circuit 310 to cause each subpixel (the light emitting element 302) to emit light for a certain time period in each frame by providing the switching signals S1-1, S1-2 . . . to driving the switches in the compensation and driving circuit 330 and the driving circuit 310. In some implementations, multiple pixel driving circuits, e.g., the pixel driving circuit 300 and the adjacent pixel driving circuit 300-1, may work in conjunction with each other.

As shown in FIG. 5, during the initialization period P1, the switches 406, 410, 412, 414, and 420 are turned on (connected), and the switches 404 and 408 are turned off (disconnected). Two ends of the capacitor 303 are initialized by V1 and VDD, and two ends of the capacitor 422 are initialized by VDD. The anode of the light emitting element 302 is reset by VR. Then, during the compensation period P2, the switches 404, 412, 414, and 420 are turned on (connected), and the switches 406, 408, and 410 are turned off (disconnected). The source terminal of the driving transistor 402 is compensated by the capacitor 303. The anode of the light emitting element 302 is reset by VR. During the data writing period P3, the switches 408, 412, 414, and 420 are turned on (connected), and the switches 404, 406, and 410 are turned off (disconnected). The first end of the capacitor 303 and the gate terminal of the driving transistor 402 are provided with the data signal VDATA. During the emitting period P4, the switches 404 and 410 are turned on (connected), and the switches 406, 408, 412, 414, and 420 are turned off (disconnected). The light emitting element 302 is driven by VDD to emit.

During the reset period, including the initialization period, the compensation period, and the data writing period, the capacitor 303 is charged by the adjacent pixel driving circuit 300-1, and the component in the pixel driving circuit 300, e.g., capacitors, can be simplified to save the cost. In addition, during the initialization period and the data writing period, the source terminal of the driving transistor 402 is disconnected from the capacitor 303 by turning off the switch 404, and the current leakage path can be therefore disconnected as well to lower the power consumption. Further, the data line (providing the data signal VDATA) and the first bias source (providing the first initialization bias signal V1) are separated and provided by two different lines, and the voltage toggle on the data line can be also reduced.

Figure 6:
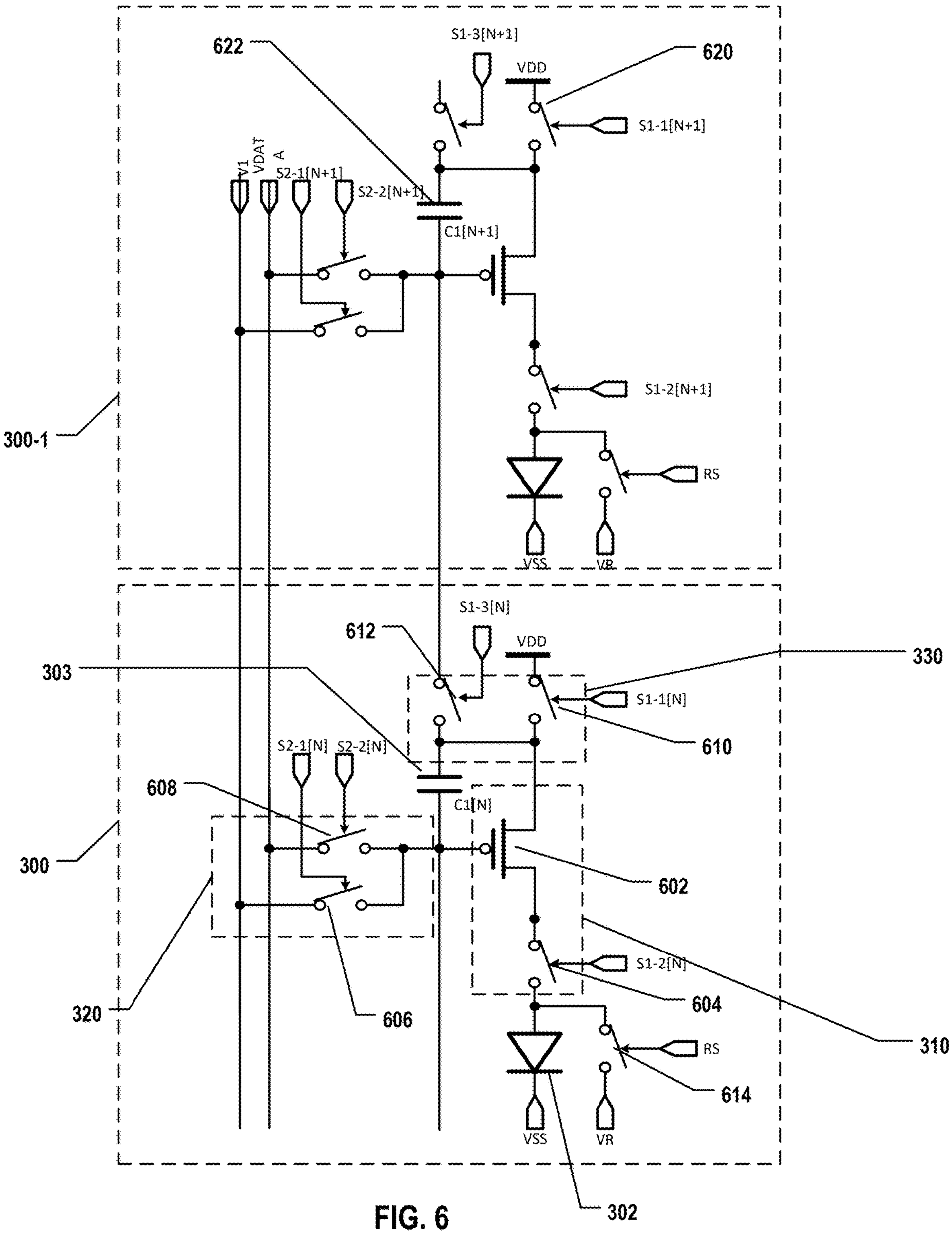
FIG. 6 illustrates a circuit diagram of a pixel driving circuit for a light emitting element, according to some aspects of the present disclosure.
Figure 7:
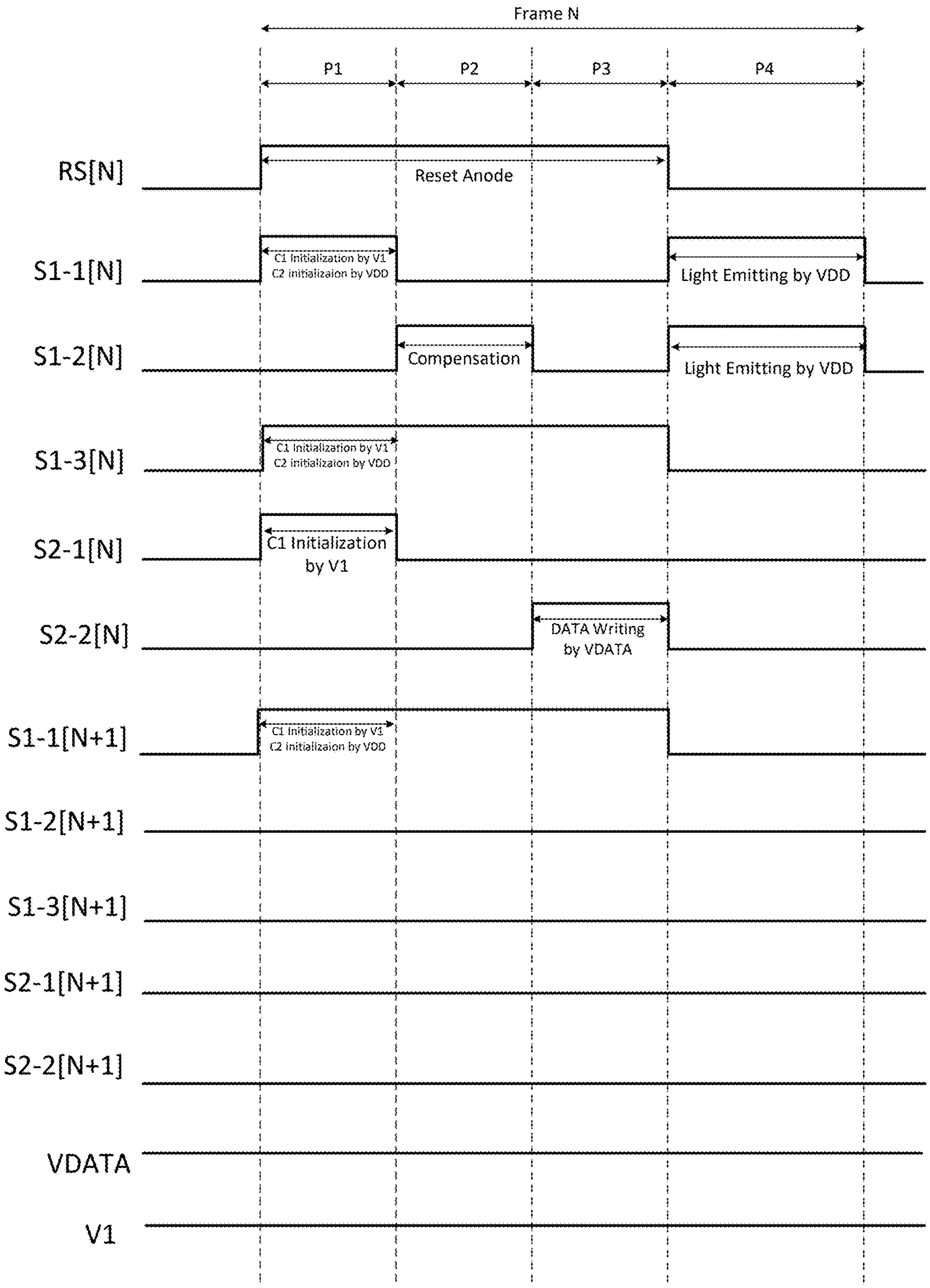
FIG. 7 illustrates a timing diagram showing the operations of the pixel driving circuit in FIG. 6, according to some aspects of the present disclosure.

FIG. 6 illustrates a circuit diagram of a pixel driving circuit 600, including the pixel driving circuit 300 and an adjacent pixel driving circuit 300-1, for the light emitting element 302, according to some aspects of the present disclosure. FIG. 7 illustrates a timing diagram showing the operations of the pixel driving circuit 600 in FIG. 6, according to some aspects of the present disclosure. For the purpose of better describing the present disclosure, the pixel driving circuit 600 in FIG. 6 and the timing diagram in FIG. 7 will be discussed together.

As shown in FIG. 6, the driving circuit 310 includes a driving transistor 602 having a gate terminal, a source terminal, and a drain terminal. The driving circuit 310 further includes a switch 604 located between the drain terminal of the driving transistor 602 and the light emitting element 302. The data writing circuit 320 may include a switch 606 and a switch 608. The compensation and driving circuit 330 may include a switch 610 and a switch 612.

The drain terminal of the driving transistor 602 is coupled to the light emitting element 302 through the switch 604, the gate terminal of the driving transistor 602 is coupled to the first end of the capacitor 303, and the source terminal of the driving transistor 402 is coupled to the switch 610, the switch 612, and the second end of the capacitor 303. The switch 610 is coupled to the second bias source (providing VDD). The switch 612 is coupled to the capacitor of the adjacent pixel driving circuit 300-1 for charge sharing. The switch 606 is coupled between the first end of the capacitor 303 and the first bias source (providing the first initialization bias signal V1). The switch 608 is coupled between the first end of the capacitor 303 and the data line (providing the data signal VDATA). The pixel driving circuit 300 further includes a reset bias source VR and a switch 614 coupled between the reset bias source VR and the anode of the light emitting element 302.

Compared with the pixel driving circuit 400, the location of the switch 404 in the pixel driving circuit 400 and the location of the switch 604 in the pixel driving circuit 600 are different. In the pixel driving circuit 400, the switch 404 is located between the driving transistor 402 and the compensation and driving circuit 330. In the pixel driving circuit 600, the switch 604 is located between the driving transistor 602 and the light emitting element 302.

As shown in FIG. 7, during the initialization period P1, the switches 606, 610, 612, 614, and 620 are turned on (connected), and the switches 604 and 608 are turned off (disconnected). Two ends of the capacitor 303 are initialized by V1 and VDD, and two ends of the capacitor 622 are initialized by VDD. The anode of the light emitting element 302 is reset by VR. Then, during the compensation period P2, the switches 604, 612, 614, and 620 are turned on (connected), and the switches 606, 608, and 610 are turned off (disconnected). The source terminal of the driving transistor 602 is compensated by the capacitor 303. The anode of the light emitting element 302 is reset by VR. During the data writing period P3, the switches 608, 612, 614, and 620 are turned on (connected), and the switches 604, 606, and 610 are turned off (disconnected). The first end of the capacitor 303 and the gate terminal of the driving transistor 602 are provided with the data signal VDATA. During the emitting period P4, the switches 604 and 610 are turned on (connected), and the switches 606, 608, 612, 614, and 620 are turned off (disconnected). The light emitting element 302 is driven by VDD to emit.

During the reset period, including the initialization period, the compensation period, and the data writing period, the capacitor 303 is charged by the adjacent pixel driving circuit 300-1, and the component in the pixel driving circuit 300, e.g., capacitors, can be simplified to save the cost. In addition, during the initialization period and the data writing period, the drain terminal of the driving transistor 602 is disconnected from the light emitting element 302 by turning off the switch 604, and the current leakage path can be therefore disconnected as well to lower the power consumption. Further, the data line (providing the data signal VDATA) and the first bias source (providing the first initialization bias signal V1) are separated and provided by two different lines, and the voltage toggle on the data line can also be reduced.

Figure 8:
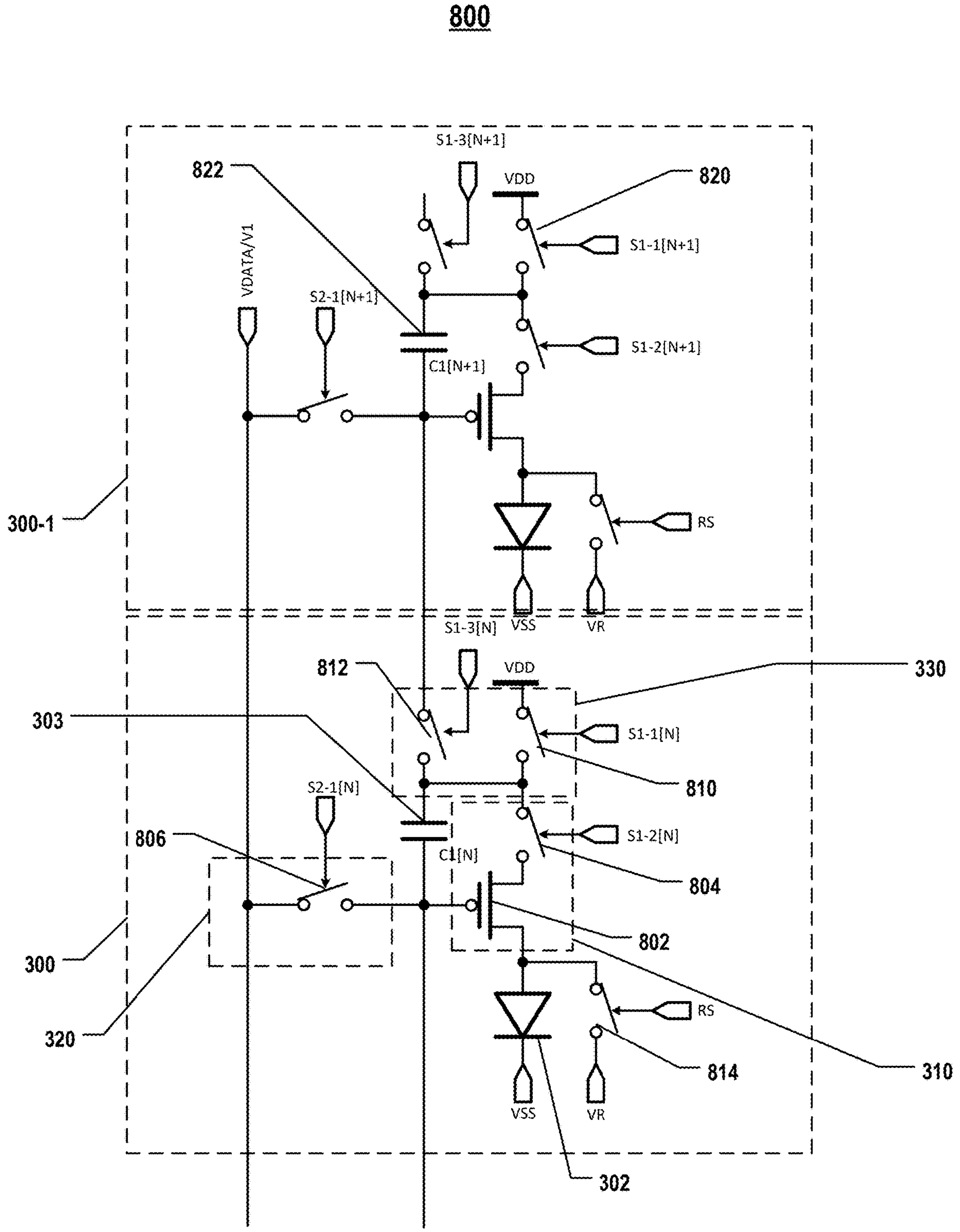
FIG. 8 illustrates a circuit diagram of a pixel driving circuit for a light emitting element, according to some aspects of the present disclosure.
Figure 9:
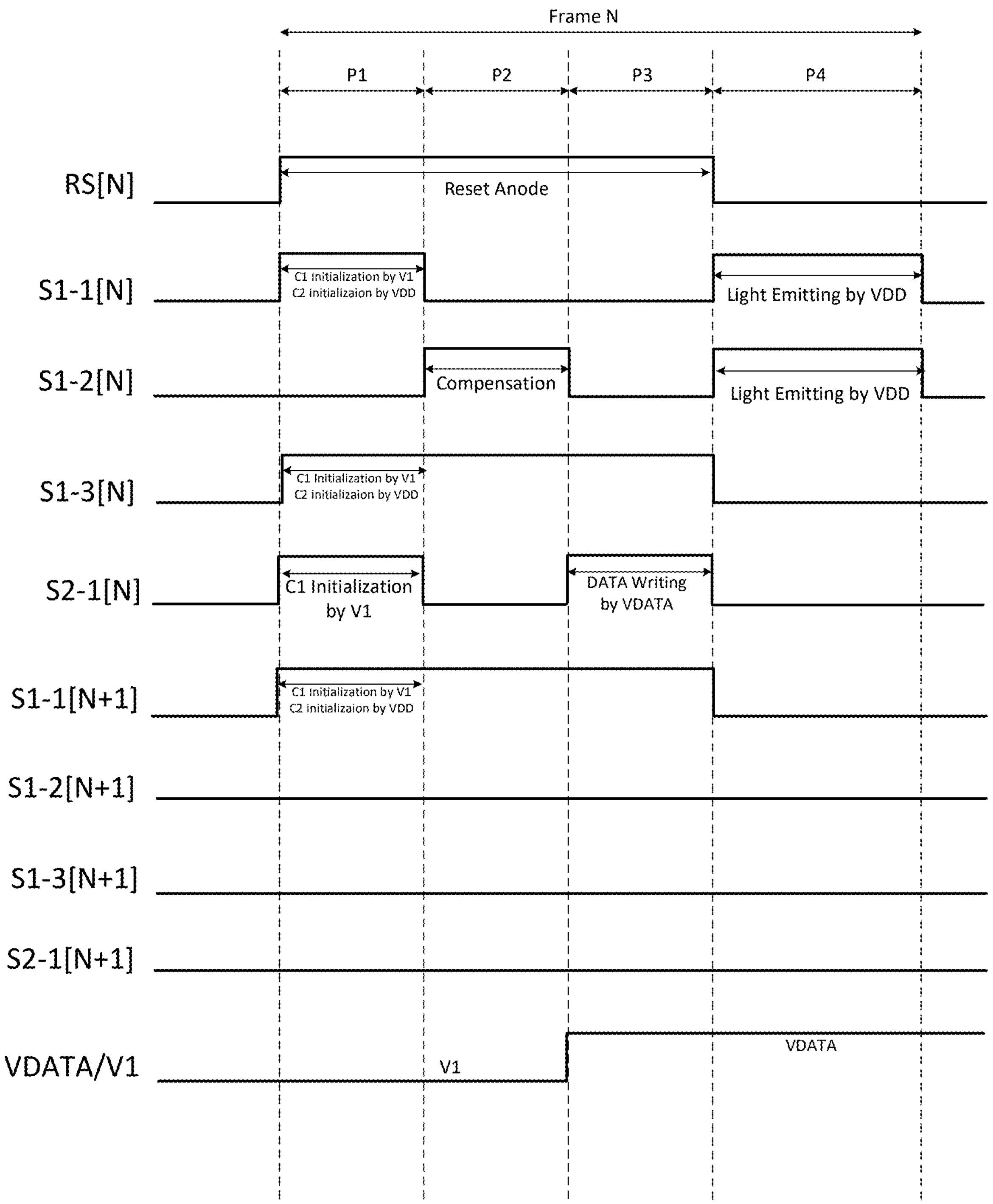
FIG. 9 illustrates a timing diagram showing the operations of the pixel driving circuit in FIG. 8, according to some aspects of the present disclosure.

FIG. 8 illustrates a circuit diagram of a pixel driving circuit 800, including the pixel driving circuit 300 and an adjacent pixel driving circuit 300-1, for the light emitting element 302, according to some aspects of the present disclosure. FIG. 9 illustrates a timing diagram showing the operations of the pixel driving circuit 800 in FIG. 8, according to some aspects of the present disclosure. For the purpose of better describing the present disclosure, the pixel driving circuit 800 in FIG. 8 and the timing diagram in FIG. 9 will be discussed together.

As shown in FIG. 8, the driving circuit 310 includes a driving transistor 802 having a gate terminal, a source terminal, and a drain terminal. The driving circuit 310 further includes a switch 804 located between the source terminal of the driving transistor 802 and the compensation and driving circuit 330. The data writing circuit 320 may include a switch 806. The compensation and driving circuit 330 may include a switch 810 and a switch 812.

The drain terminal of the driving transistor 802 is coupled to the light emitting element 302, the gate terminal of the driving transistor 802 is coupled to the first end of the capacitor 303, and the source terminal of the driving transistor 802 is coupled to the switch 804. The other end of the switch 804 is coupled to the switch 810, the switch 812, and the second end of the capacitor 303. The switch 810 is coupled to the second bias source (providing VDD). The switch 812 is coupled to the capacitor of the adjacent pixel driving circuit 300-1 for charge sharing. The switch 806 is coupled between the first end of the capacitor 303 and an integrated bias/data line that can provide the first initialization bias signal V1 and the data signal VDATA in different periods. The pixel driving circuit 300 further includes a reset bias source VR and a switch 814 coupled between the reset bias source VR and the anode of the light emitting element 302.

Compared with the pixel driving circuit 400, in the pixel driving circuit 400, the data line (providing the data signal VDATA) and the first bias source (providing the first initialization bias signal V1) are separated and provided by two different lines. However, in the pixel driving circuit 800, the data line and the first bias source are integrated into one line that provides both the data signal VDATA and the first initialization bias signal V1 individually during different operation periods. In some implementations, the integrated bias/data line provides the first initialization bias signal V1 during the initialization period P1 and provides the data signal VDATA during the data writing period P3.

As shown in FIG. 9, during the initialization period P1, the switches 806, 810, 812, 814, and 820 are turned on (connected), and the switch 804 is turned off (disconnected). Two ends of the capacitor 303 are initialized by V1 and VDD, and two ends of the capacitor 822 are initialized by VDD. The anode of the light emitting element 302 is reset by VR. Then, during the compensation period P2, the switches 804, 812, 814, and 820 are turned on (connected), and the switches 806 and 810 are turned off (disconnected). The source terminal of the driving transistor 802 is compensated by the capacitor 303. The anode of the light emitting element 302 is reset by VR. During the data writing period P3, the switches 806, 812, 814, and 820 are turned on (connected), and the switches 804 and 810 are turned off (disconnected). The first end of the capacitor 303 and the gate terminal of the driving transistor 802 are provided with the data signal VDATA. During the emitting period P4, the switches 804 and 810 are turned on (connected), and the switches 806, 812, 814, and 820 are turned off (disconnected). The light emitting element 302 is driven by VDD to emit.

During the reset period, including the initialization period, the compensation period, and the data writing period, the capacitor 303 is charged by the adjacent pixel driving circuit 300-1, and the component in the pixel driving circuit 300, e.g., capacitors, can be simplified to save the cost. In addition, during the initialization period and the data writing period, the source terminal of the driving transistor 802 is disconnected from the capacitor 303 by turning off the switch 804, and the current leakage path can be therefore disconnected as well to lower the power consumption.

Figure 10:
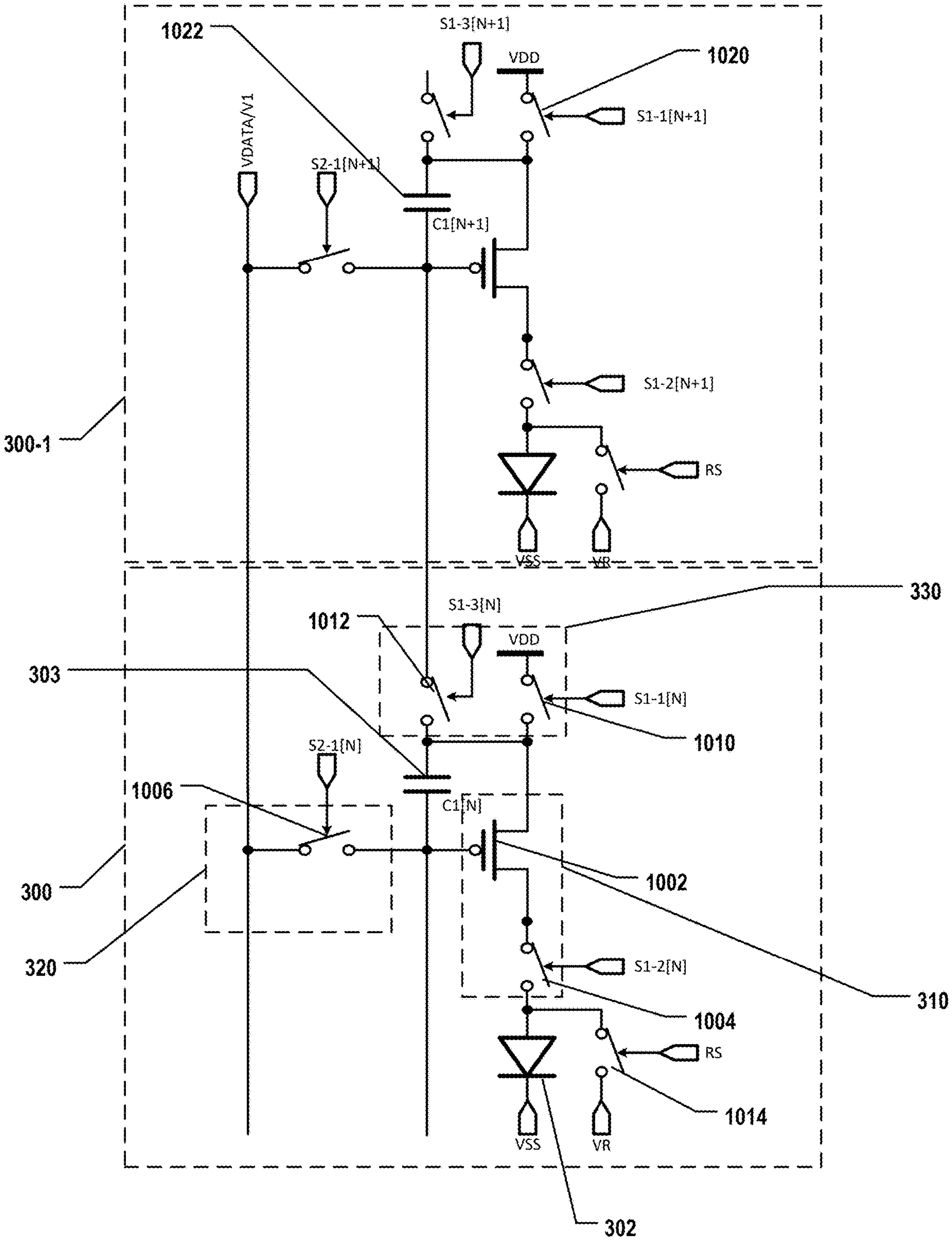
FIG. 10 illustrates a circuit diagram of a pixel driving circuit for a light emitting element, according to some aspects of the present disclosure.
Figure 11:
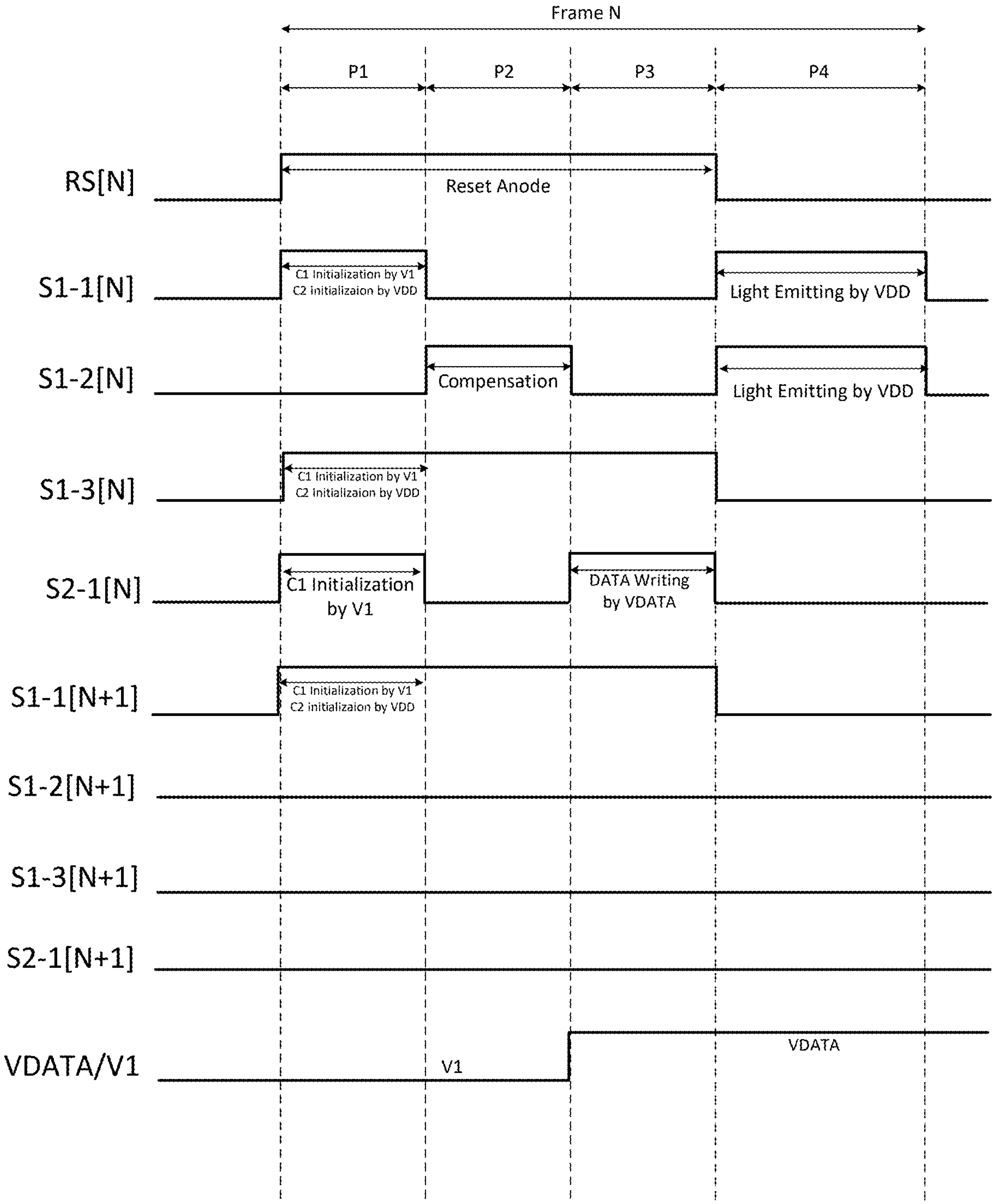
FIG. 11 illustrates a timing diagram showing the operations of the pixel driving circuit in FIG. 10, according to some aspects of the present disclosure.

FIG. 10 illustrates a circuit diagram of a pixel driving circuit 1000, including the pixel driving circuit 300 and an adjacent pixel driving circuit 300-1, for the light emitting element 302, according to some aspects of the present disclosure. FIG. 11 illustrates a timing diagram showing the operations of the pixel driving circuit 1000 in FIG. 10, according to some aspects of the present disclosure. For the purpose of better describing the present disclosure, the pixel driving circuit 1000 in FIG. 10 and the timing diagram in FIG. 11 will be discussed together.

As shown in FIG. 10, the driving circuit 310 includes a driving transistor 1002 having a gate terminal, a source terminal, and a drain terminal. The driving circuit 310 further includes a switch 1004 located between the drain terminal of the driving transistor 1002 and the light emitting element 302. The data writing circuit 320 may include a switch 1006. The compensation and driving circuit 330 may include a switch 1010 and a switch 1012.

The drain terminal of the driving transistor 1002 is coupled to the light emitting element 302 through the switch 1004, the gate terminal of the driving transistor 1002 is coupled to the first end of the capacitor 303, and the source terminal of the driving transistor 1002 is coupled to the switch 1010, the switch 1012, and the second end of the capacitor 303. The switch 1010 is coupled to the second bias source (providing VDD). The switch 1012 is coupled to the capacitor of the adjacent pixel driving circuit 300-1 for charge sharing. The switch 1006 is coupled between the first end of the capacitor 303 and an integrated bias/data line that can provide the first initialization bias signal V1 and the data signal VDATA in different periods. The pixel driving circuit 300 further includes a reset bias source VR and a switch 1014 coupled between the reset bias source VR and the anode of the light emitting element 302.

Compared with the pixel driving circuit 800, the location of the switch 804 in the pixel driving circuit 800 and the location of the switch 1004 in the pixel driving circuit 1000 are different. In the pixel driving circuit 800, the switch 804 is located between the driving transistor 802 and the compensation and driving circuit 330. In the pixel driving circuit 1000, the switch 1004 is located between the driving transistor 1002 and the light emitting element 302.

As shown in FIG. 11, during the initialization period P1, the switches 1006, 1010, 1012, 1014, and 1020 are turned on (connected), and the switch 1004 is turned off (disconnected). Two ends of the capacitor 303 are initialized by V1 and VDD, and two ends of the capacitor 1022 are initialized by VDD. The anode of the light emitting element 302 is reset by VR. Then, during the compensation period P2, the switches 1004, 1012, 1014, and 1020 are turned on (connected), and the switches 1006 and 1010 are turned off (disconnected). The source terminal of the driving transistor 1002 is compensated by the capacitor 303. The anode of the light emitting element 302 is reset by VR. During the data writing period P3, the switches 1006, 1012, 1014, and 1020 are turned on (connected), and the switches 1004 and 1010 are turned off (disconnected). The first end of the capacitor 303 and the gate terminal of the driving transistor 1002 are provided with the data signal VDATA. During the emitting period P4, the switches 1004 and 1010 are turned on (connected), and the switches 1006, 1012, 1014, and 1020 are turned off (disconnected). The light emitting element 302 is driven by VDD to emit.

During the reset period, including the initialization period, the compensation period, and the data writing period, the capacitor 303 is charged by the adjacent pixel driving circuit 300-1, and the component in the pixel driving circuit 300, e.g., capacitors, can be simplified to save the cost. In addition, during the initialization period and the data writing period, the drain terminal of the driving transistor 1002 is disconnected from the light emitting element 302 by turning off the switch 1004, and the current leakage path can be therefore disconnected as well to lower the power consumption.

Figure 12:
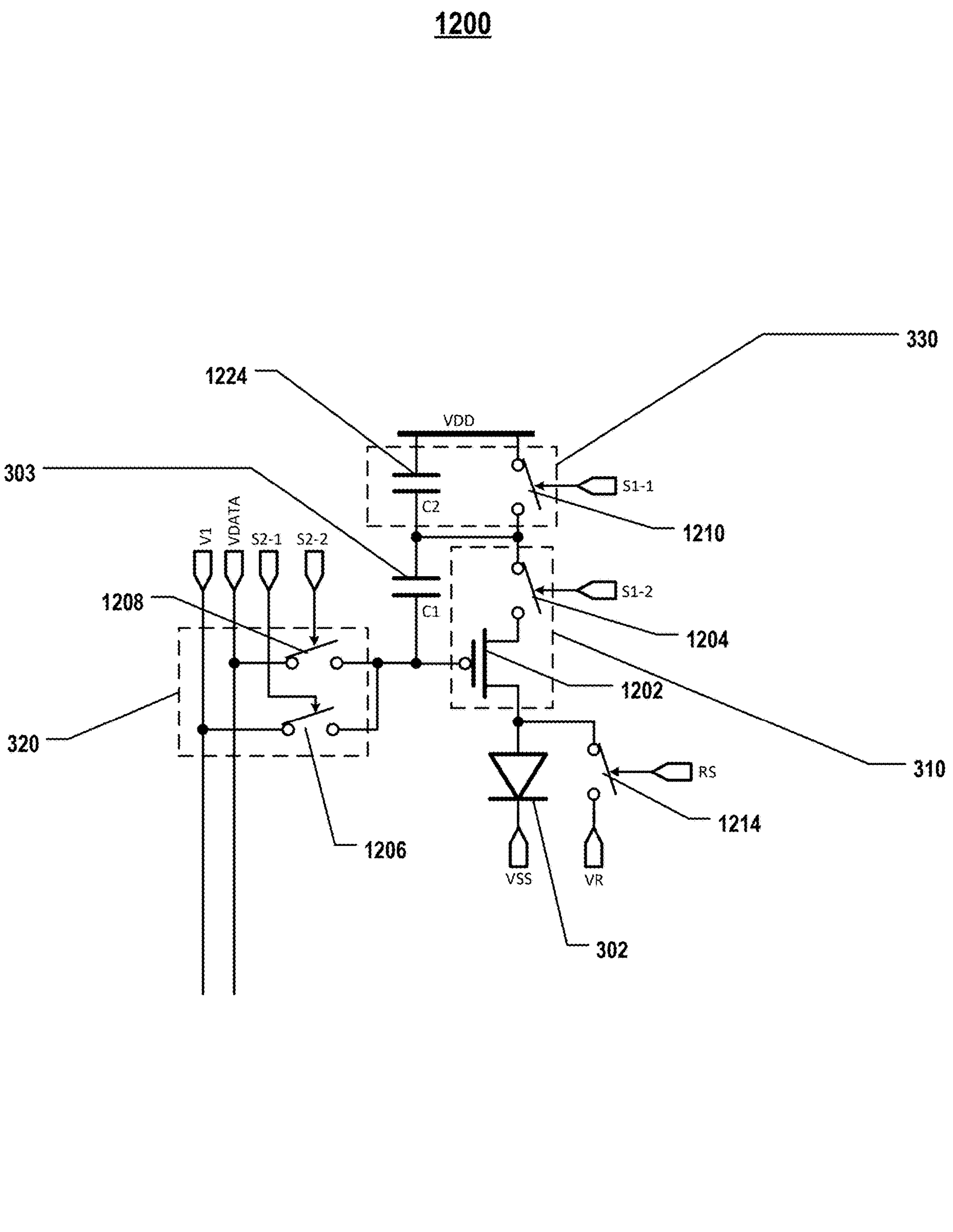
FIG. 12 illustrates a circuit diagram of a pixel driving circuit for a light emitting element, according to some aspects of the present disclosure.
Figure 13:
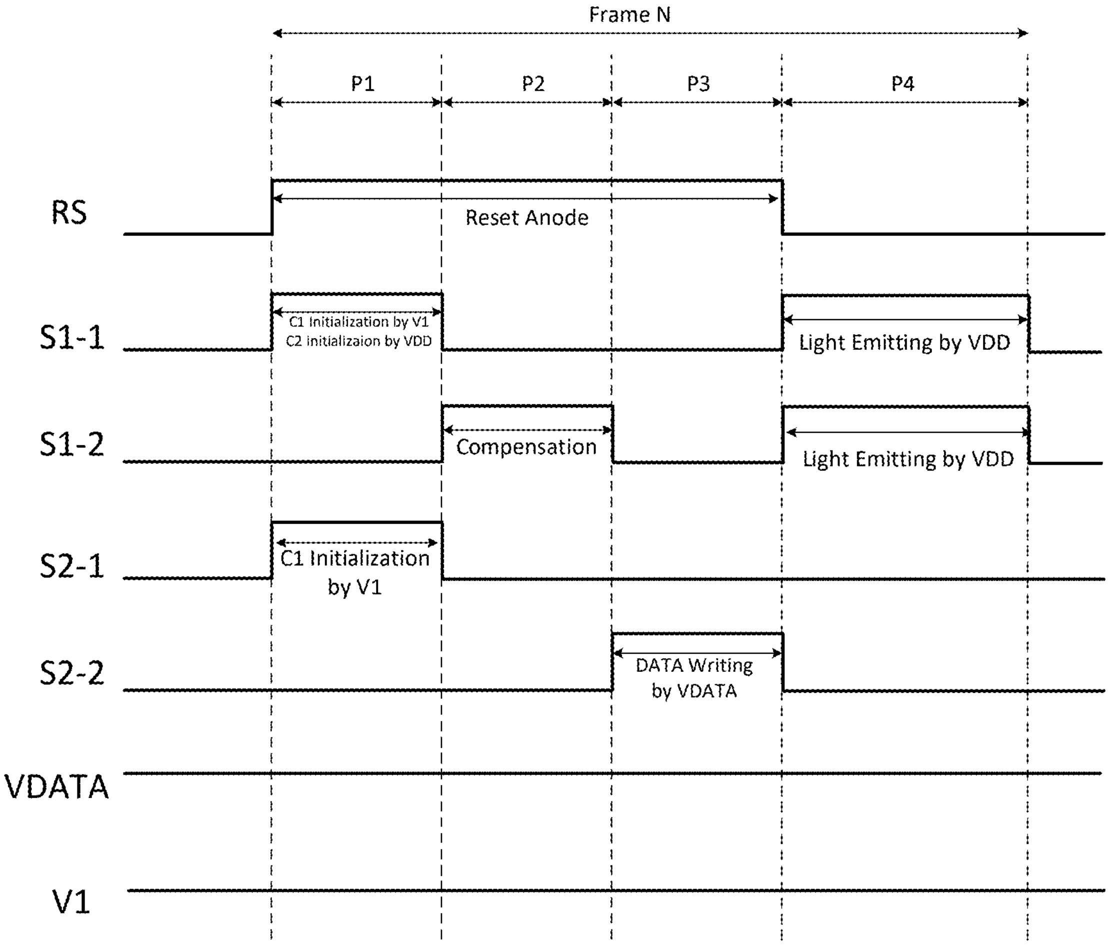
FIG. 13 illustrates a timing diagram showing the operations of the pixel driving circuit in FIG. 12, according to some aspects of the present disclosure.

FIG. 12 illustrates a circuit diagram of a pixel driving circuit 1200 for the light emitting element 302, according to some aspects of the present disclosure. FIG. 13 illustrates a timing diagram showing the operations of the pixel driving circuit 1200 in FIG. 12, according to some aspects of the present disclosure. For the purpose of better describing the present disclosure, the pixel driving circuit 1200 in FIG. 12 and the timing diagram in FIG. 13 will be discussed together. In some implementations, the pixel driving circuit 1200 may be the pixel driving circuit 300 without connecting to an adjacent pixel driving circuit for charge sharing.

As shown in FIG. 12, the driving circuit 310 includes a driving transistor 1202 having a gate terminal, a source terminal, and a drain terminal. The driving circuit 310 further includes a switch 1204 located between the source terminal of the driving transistor 1202 and the compensation and driving circuit 330. The data writing circuit 320 may include a switch 1206 and a switch 1208. The compensation and driving circuit 330 may include a switch 1210 and a capacitor 1224.

The drain terminal of the driving transistor 1202 is coupled to the light emitting element 302, the gate terminal of the driving transistor 1202 is coupled to the first end of the capacitor 303, and the source terminal of the driving transistor 1202 is coupled to the switch 1204. The other end of the switch 1204 is coupled to the switch 1210, the capacitor 1224, and the second end of the capacitor 303. The switch 1210 is coupled to the second bias source (providing VDD). The capacitor 1224 is also coupled to the second bias source (providing VDD). The switch 1206 is coupled between the first end of the capacitor 303 and the first bias source (providing the first initialization bias signal V1). The switch 1208 is coupled between the first end of the capacitor 303 and the data line (providing the data signal VDATA). The pixel driving circuit 1200 further includes a reset bias source VR and a switch 1214 coupled between the reset bias source VR and the anode of the light emitting element 302.

Compared to the pixel driving circuit 400, the pixel driving circuit 1200 is not connected to an adjacent pixel driving circuit for charge sharing. Instead, the capacitor 1224 is connected to the capacitor 303 to provide the compensation function.

As shown in FIG. 13, during the initialization period P1, the switches 1206, 1210, and 1214 are turned on (connected), and the switches 1204 and 1208 are turned off (disconnected). Two ends of the capacitor 303 are initialized by V1 and VDD, and two ends of the capacitor 1224 are initialized by VDD. The anode of the light emitting element 302 is reset by VR. Then, during the compensation period P2, the switches 1204 and 1214 are turned on (connected), and the switches 1206, 1208, and 1210 are turned off (disconnected). The source terminal of the driving transistor 1202 is compensated by the capacitor 303 and the capacitor 1224. The anode of the light emitting element 302 is reset by VR. During the data writing period P3, the switches 1208 and 1214 are turned on (connected), and the switches 1204, 1206, and 1210 are turned off (disconnected). The first end of the capacitor 303 and the gate terminal of the driving transistor 1202 are provided with the data signal VDATA. During the emitting period P4, the switches 1204 and 1210 are turned on (connected), and the switches 1206, 1208, and 1214 are turned off (disconnected). The light emitting element 302 is driven by VDD to emit.

During the initialization period and the data writing period, the source terminal of the driving transistor 1202 is disconnected from the capacitor 303 by turning off the switch 1204, and the current leakage path can be, therefore, disconnected as well to lower the power consumption. Further, the data line (providing the data signal VDATA) and the first bias source (providing the first initialization bias signal V1) are separated and provided by two different lines, and the voltage toggle on the data line can be also reduced.

Figure 14:
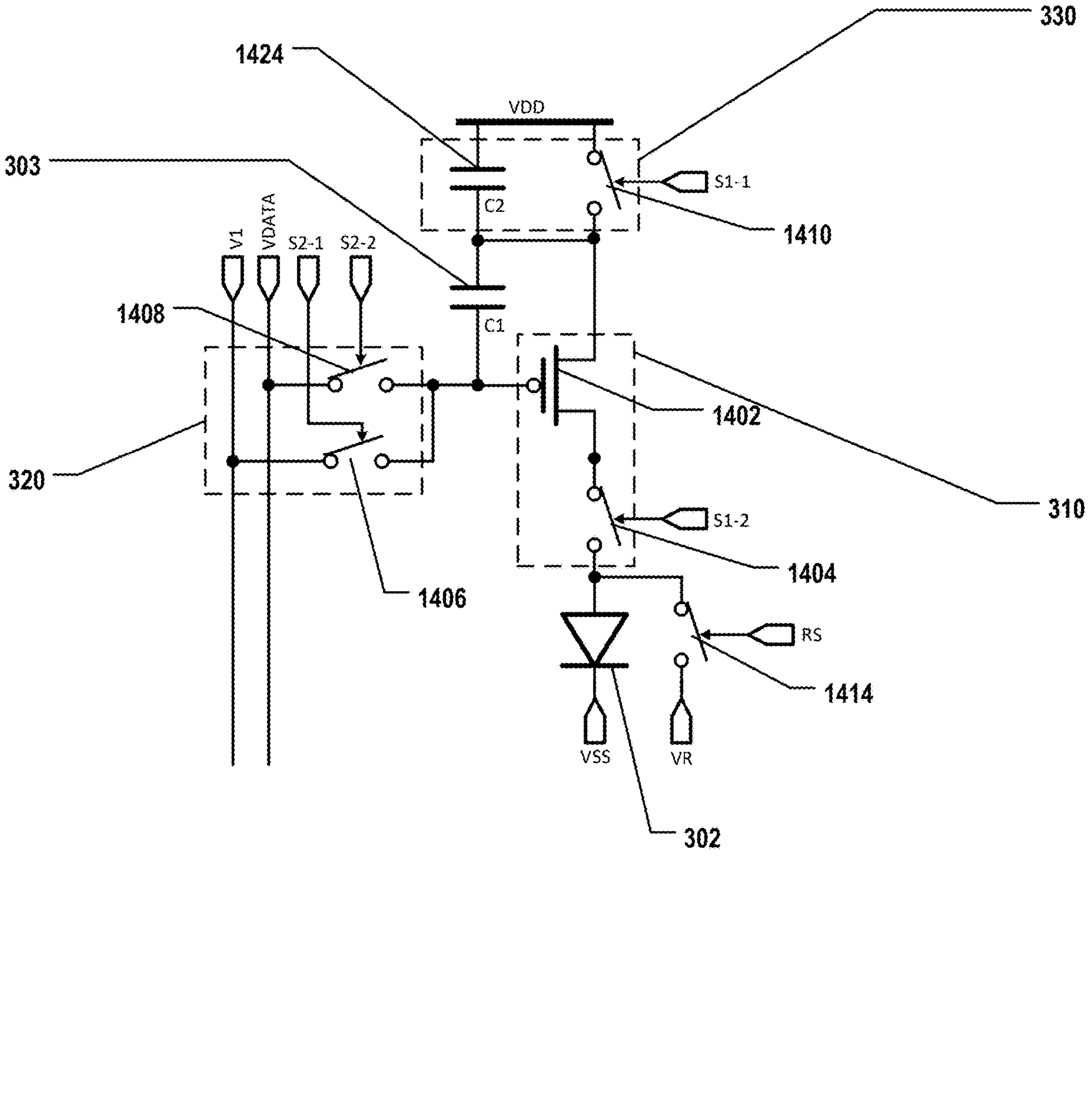
FIG. 14 illustrates a circuit diagram of a pixel driving circuit for a light emitting element, according to some aspects of the present disclosure.
Figure 15:
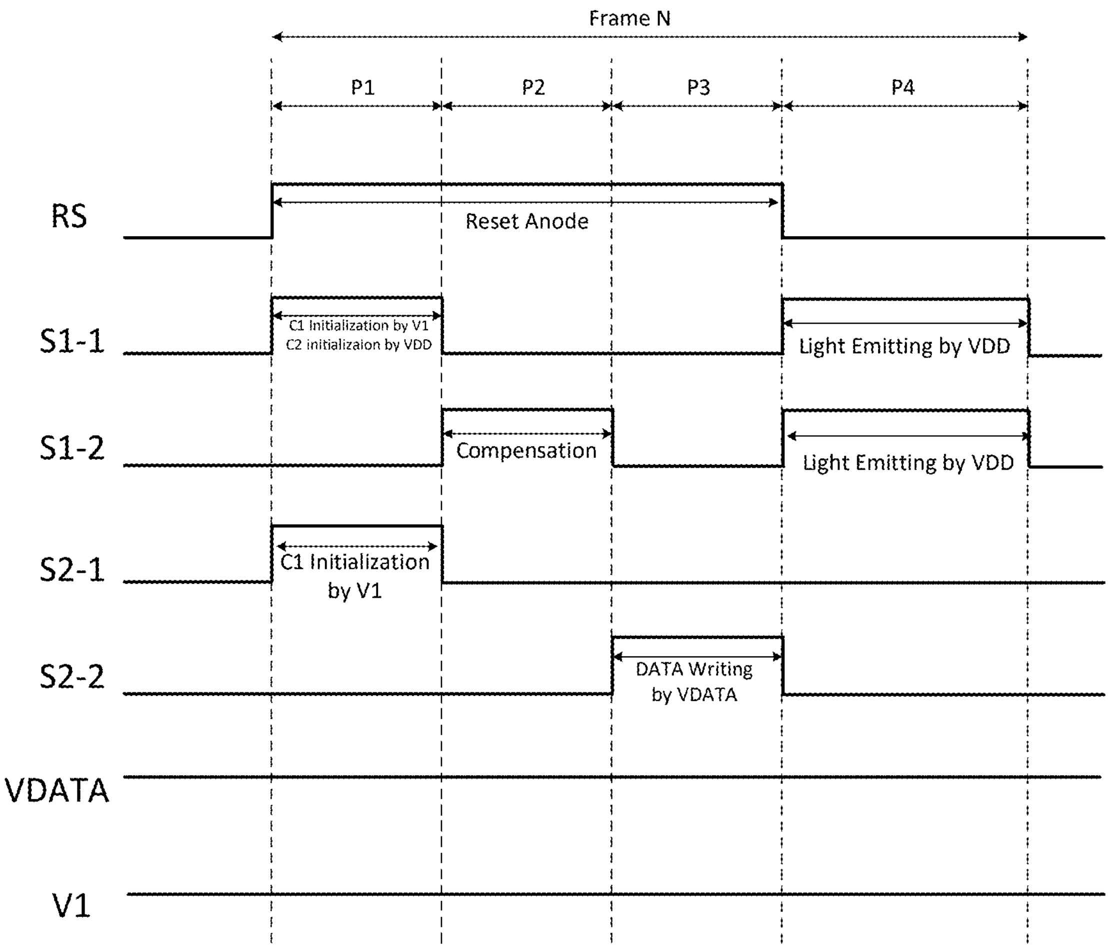
FIG. 15 illustrates a timing diagram showing the operations of the pixel driving circuit in FIG. 14, according to some aspects of the present disclosure.

FIG. 14 illustrates a circuit diagram of a pixel driving circuit 1400 for the light emitting element 302, according to some aspects of the present disclosure. FIG. 15 illustrates a timing diagram showing the operations of the pixel driving circuit 1400 in FIG. 14, according to some aspects of the present disclosure. For the purpose of better describing the present disclosure, the pixel driving circuit 1400 in FIG. 14 and the timing diagram in FIG. 15 will be discussed together. In some implementations, the pixel driving circuit 1400 may be the pixel driving circuit 300 without connecting to an adjacent pixel driving circuit for charge sharing.

As shown in FIG. 14, the driving circuit 310 includes a driving transistor 1402 having a gate terminal, a source terminal, and a drain terminal. The driving circuit 310 further includes a switch 1404 located between the drain terminal of the driving transistor 1402 and the light emitting element 302. The data writing circuit 320 may include a switch 1406 and a switch 1408. The compensation and driving circuit 330 may include a switch 1410 and a capacitor 1424.

The drain terminal of the driving transistor 1402 is coupled to the light emitting element 302 through the switch 1404, the gate terminal of the driving transistor 1402 is coupled to the first end of the capacitor 303, and the source terminal of the driving transistor 1402 is coupled to the switch 1410, the capacitor 1424, and the second end of the capacitor 303. The switch 1410 is coupled to the second bias source (providing VDD). The capacitor 1424 is also coupled to the second bias source (providing VDD). The switch 1406 is coupled between the first end of the capacitor 303 and the first bias source (providing the first initialization bias signal V1). The switch 1408 is coupled between the first end of the capacitor 303 and the data line (providing the data signal VDATA). The pixel driving circuit 1400 further includes a reset bias source VR and a switch 1414 coupled between the reset bias source VR and the anode of the light emitting element 302.

Compared with the pixel driving circuit 1200, the location of the switch 1204 in the pixel driving circuit 1200 and the location of the switch 1404 in the pixel driving circuit 1400 are different. In the pixel driving circuit 1200, the switch 1204 is located between the driving transistor 1202 and the compensation and driving circuit 330. In the pixel driving circuit 1400, the switch 1404 is located between the driving transistor 1402 and the light emitting element 302.

As shown in FIG. 15, during the initialization period P1, the switches 1406, 1410, and 1414 are turned on (connected), and the switches 1404 and 1408 are turned off (disconnected). Two ends of the capacitor 303 are initialized by V1 and VDD, and two ends of the capacitor 1424 are initialized by VDD. The anode of the light emitting element 302 is reset by VR. Then, during the compensation period P2, the switches 1404 and 1414 are turned on (connected), and the switches 1406, 1408, and 1410 are turned off (disconnected). The source terminal of the driving transistor 1402 is compensated by the capacitor 303 and the capacitor 1424. The anode of the light emitting element 302 is reset by VR. During the data writing period P3, the switches 1408 and 1414 are turned on (connected), and the switches 1404, 1406, and 1410 are turned off (disconnected). The first end of the capacitor 303 and the gate terminal of the driving transistor 1402 are provided with the data signal VDATA. During the emitting period P4, the switches 1404 and 1410 are turned on (connected), and the switches 1406, 1408, and 1414 are turned off (disconnected). The light emitting element 302 is driven by VDD to emit.

During the initialization period and the data writing period, the drain terminal of the driving transistor 1402 is disconnected from the anode of the light emitting element 302 by turning off the switch 1404, and the current leakage path can be therefore disconnected as well to lower the power consumption. Further, the data line (providing the data signal VDATA) and the first bias source (providing the first initialization bias signal V1) are separated and provided by two different lines, and the voltage toggle on the data line can also be reduced.

Figure 16:
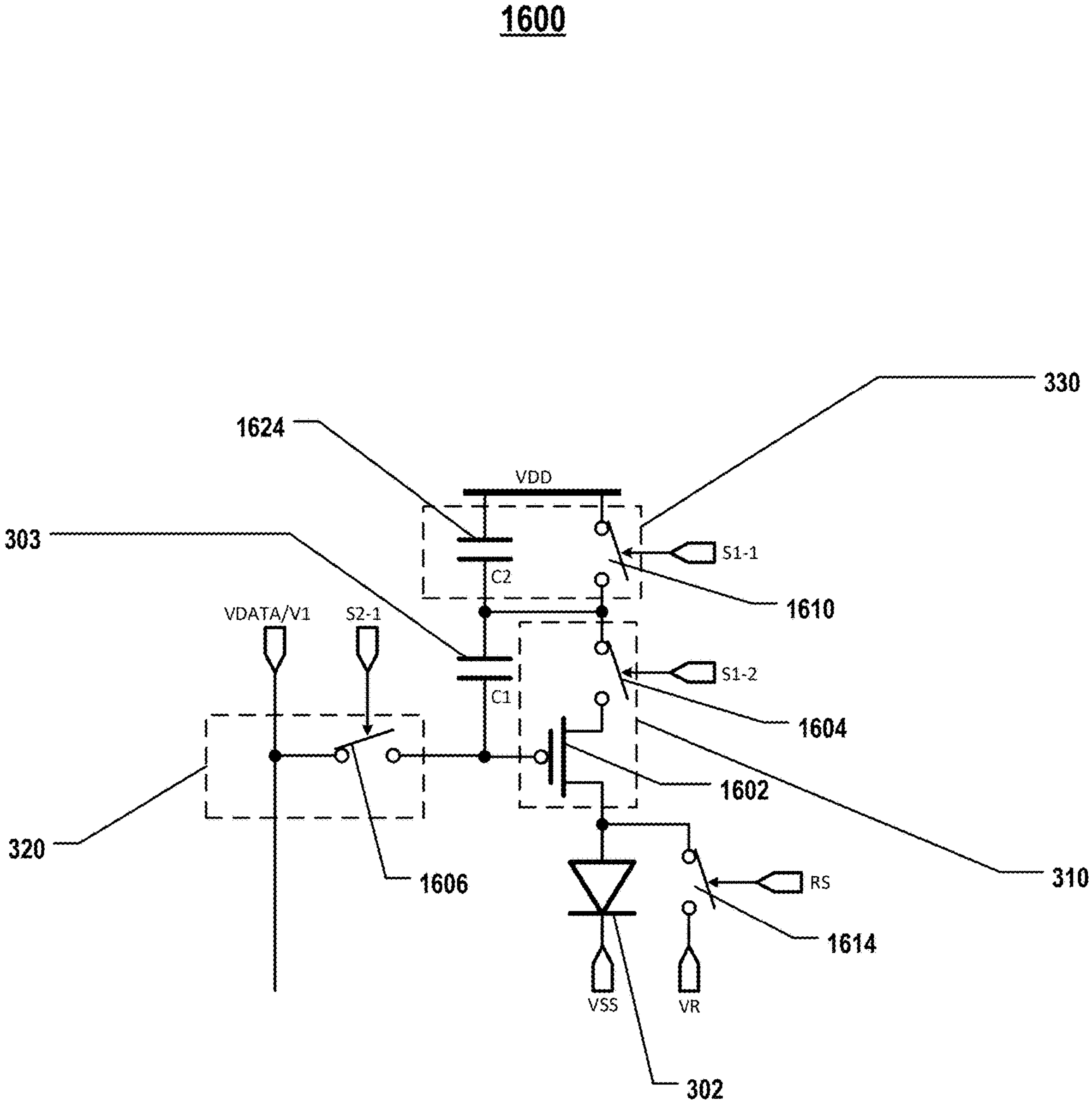
FIG. 16 illustrates a circuit diagram of a pixel driving circuit for a light emitting element, according to some aspects of the present disclosure.
Figure 17:
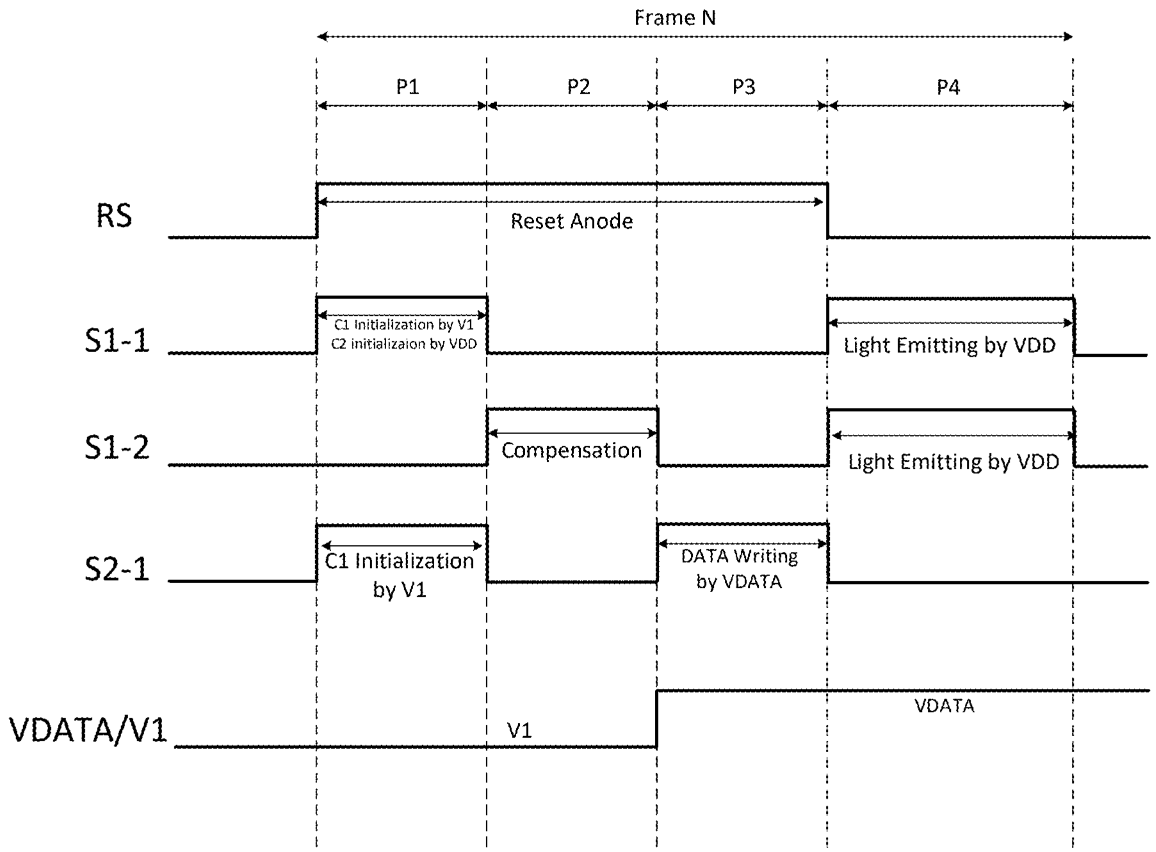
FIG. 17 illustrates a timing diagram showing the operations of the pixel driving circuit in FIG. 16, according to some aspects of the present disclosure.

FIG. 16 illustrates a circuit diagram of a pixel driving circuit 1600 for the light emitting element 302, according to some aspects of the present disclosure. FIG. 17 illustrates a timing diagram showing the operations of the pixel driving circuit 1600 in FIG. 16, according to some aspects of the present disclosure. For the purpose of better describing the present disclosure, the pixel driving circuit 1600 in FIG. 16 and the timing diagram in FIG. 17 will be discussed together. In some implementations, the pixel driving circuit 1600 may be the pixel driving circuit 300 without connecting to an adjacent pixel driving circuit for charge sharing.

As shown in FIG. 16, the driving circuit 310 includes a driving transistor 1602 having a gate terminal, a source terminal, and a drain terminal. The driving circuit 310 further includes a switch 1604 located between the source terminal of the driving transistor 1602 and the compensation and driving circuit 330. The data writing circuit 320 may include a switch 1606. The compensation and driving circuit 330 may include a switch 1610 and a capacitor 1624.

The drain terminal of the driving transistor 1602 is coupled to the light emitting element 302, the gate terminal of the driving transistor 1602 is coupled to the first end of the capacitor 303, and the source terminal of the driving transistor 1602 is coupled to the switch 1604. The other end of the switch 1604 is coupled to the switch 1610, the capacitor 1624, and the second end of the capacitor 303. The switch 1610 is coupled to the second bias source (providing VDD). The capacitor 1624 is also coupled to the second bias source (providing VDD). The switch 1606 is coupled between the first end of the capacitor 303 and an integrated bias/data line that can provide the first initialization bias signal V1 and the data signal VDATA in different periods. The pixel driving circuit 1600 further includes a reset bias source VR and a switch 1614 coupled between the reset bias source VR and the anode of the light emitting element 302.

Compared to the pixel driving circuit 1200, in the pixel driving circuit 1200, the data line (providing the data signal VDATA) and the first bias source (providing the first initialization bias signal V1) are separated and provided by two different lines. However, in the pixel driving circuit 1600, the data line and the first bias source are integrated into one line that provides both the data signal VDATA and the first initialization bias signal V1 individually during different operation periods. In some implementations, the integrated bias/data line provides the first initialization bias signal V1 during the initialization period P1 and provides the data signal VDATA during the data writing period P3.

As shown in FIG. 17, during the initialization period P1, the switches 1606, 1610, and 1614 are turned on (connected), and the switch 1604 is turned off (disconnected). Two ends of the capacitor 303 are initialized by V1 and VDD, and two ends of the capacitor 1624 are initialized by VDD. The anode of the light emitting element 302 is reset by VR. Then, during the compensation period P2, the switches 1604 and 1614 are turned on (connected), and the switches 1606 and 1610 are turned off (disconnected). The source terminal of the driving transistor 1602 is compensated by the capacitor 303 and the capacitor 1624. The anode of the light emitting element 302 is reset by VR. During the data writing period P3, the switches 1606 and 1614 are turned on (connected), and the switches 1604 and 1610 are turned off (disconnected). The first end of the capacitor 303 and the gate terminal of the driving transistor 1602 are provided with the data signal VDATA. During the emitting period P4, the switches 1604 and 1610 are turned on (connected), and the switches 1606 and 1614 are turned off (disconnected). The light emitting element 302 is driven by VDD to emit.

During the initialization period and the data writing period, the source terminal of the driving transistor 1602 is disconnected from the capacitor 303 by turning off the switch 1604, and the current leakage path can be, therefore, disconnected as well to lower the power consumption.

Figure 18:
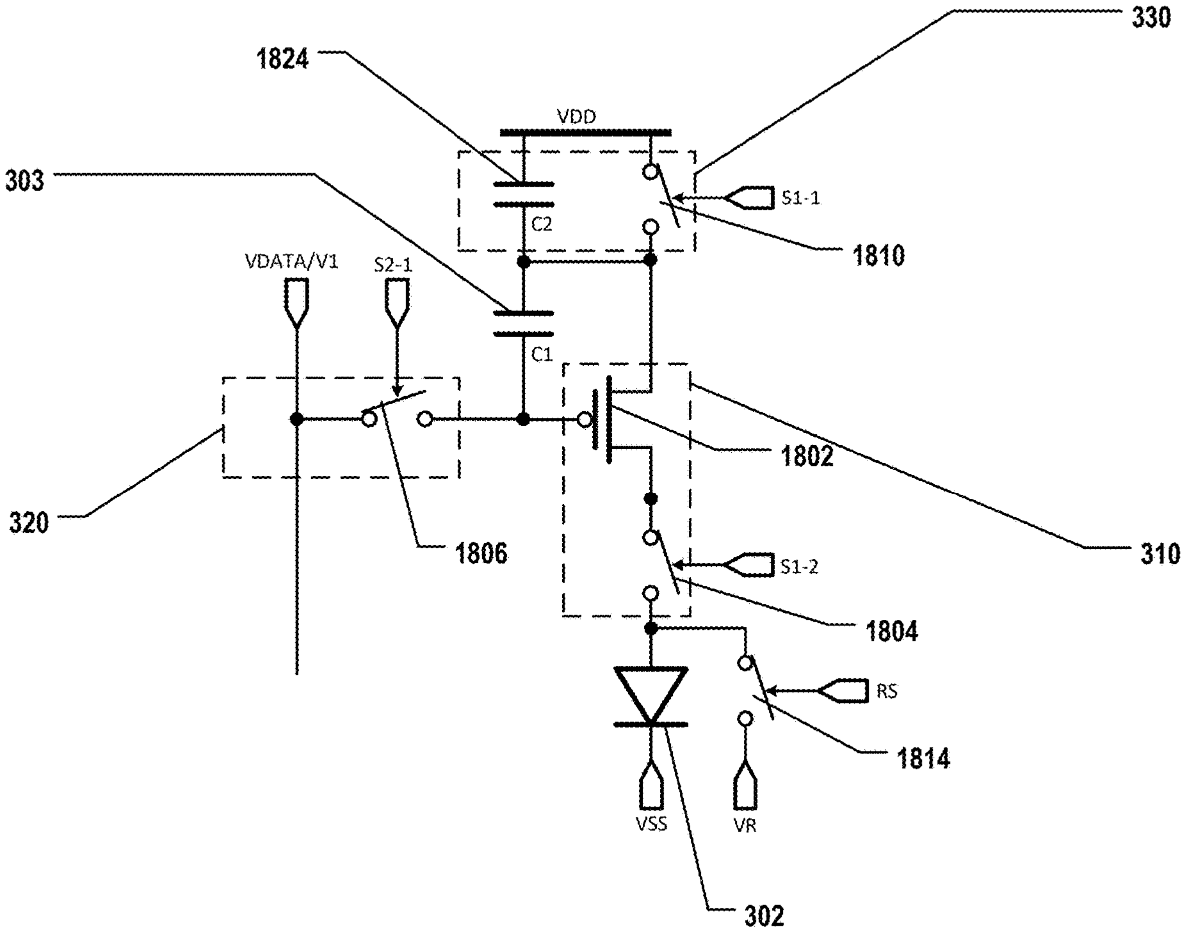
FIG. 18 illustrates a circuit diagram of a pixel driving circuit for a light emitting element, according to some aspects of the present disclosure.
Figure 19:
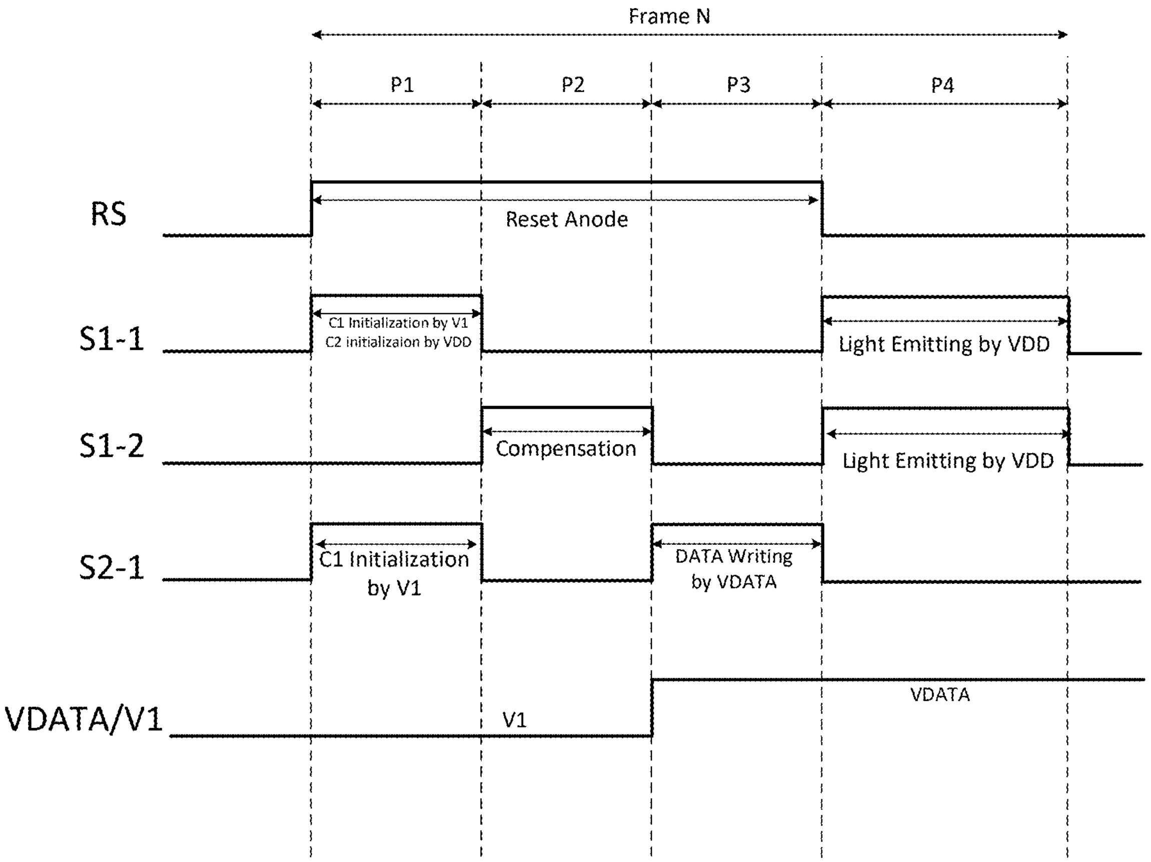
FIG. 19 illustrates a timing diagram showing the operations of the pixel driving circuit in FIG. 18, according to some aspects of the present disclosure.

FIG. 18 illustrates a circuit diagram of a pixel driving circuit 1800 for the light emitting element 302, according to some aspects of the present disclosure. FIG. 19 illustrates a timing diagram showing the operations of the pixel driving circuit 1800 in FIG. 18, according to some aspects of the present disclosure. For the purpose of better describing the present disclosure, the pixel driving circuit 1800 in FIG. 18 and the timing diagram in FIG. 19 will be discussed together. In some implementations, the pixel driving circuit 1800 may be the pixel driving circuit 300 without connecting to an adjacent pixel driving circuit for charge sharing.

As shown in FIG. 18, the driving circuit 310 includes a driving transistor 1802 having a gate terminal, a source terminal, and a drain terminal. The driving circuit 310 further includes a switch 1804 located between the drain terminal of the driving transistor 1802 and the light emitting element 302. The data writing circuit 320 may include a switch 1806. The compensation and driving circuit 330 may include a switch 1810 and a capacitor 1824.

The drain terminal of the driving transistor 1802 is coupled to the light emitting element 302 through the switch 1804, the gate terminal of the driving transistor 1802 is coupled to the first end of the capacitor 303, and the source terminal of the driving transistor 1802 is coupled to the switch 1810, the capacitor 1824, and the second end of the capacitor 303. The switch 1810 is coupled to the second bias source (providing VDD). The capacitor 1824 is also coupled to the second bias source (providing VDD). The switch 1806 is coupled between the first end of the capacitor 303 and an integrated bias/data line that can provide the first initialization bias signal V1 and the data signal VDATA in different periods. The pixel driving circuit 1800 further includes a reset bias source VR and a switch 1814 coupled between the reset bias source VR and the anode of the light emitting element 302.

Compared with the pixel driving circuit 1600, the location of the switch 1604 in the pixel driving circuit 1600 and the location of the switch 1804 in the pixel driving circuit 1800 are different. In the pixel driving circuit 1600, the switch 1604 is located between the driving transistor 1602 and the compensation and driving circuit 330. In the pixel driving circuit 1800, the switch 1804 is located between the driving transistor 1802 and the light emitting element 302.

As shown in FIG. 19, during the initialization period P1, the switches 1806, 1810, and 1814 are turned on (connected), and the switch 1804 is turned off (disconnected). Two ends of the capacitor 303 are initialized by V1 and VDD, and two ends of the capacitor 1824 are initialized by VDD. The anode of the light emitting element 302 is reset by VR. Then, during the compensation period P2, the switches 1804 and 1814 are turned on (connected), and the switches 1806 and 1810 are turned off (disconnected). The source terminal of the driving transistor 1802 is compensated by the capacitor 303 and the capacitor 1824. The anode of the light emitting element 302 is reset by VR. During the data writing period P3, the switches 1806 and 1814 are turned on (connected), and the switches 1804 and 1810 are turned off (disconnected). The first end of the capacitor 303 and the gate terminal of the driving transistor 1802 are provided with the data signal VDATA. During the emitting period P4, the switches 1804 and 1810 are turned on (connected), and the switches 1806 and 1814 are turned off (disconnected). The light emitting element 302 is driven by VDD to emit.

During the initialization period and the data writing period, the drain terminal of the driving transistor 1802 is disconnected from the light emitting element 302 by turning off the switch 1804, and the current leakage path can be therefore disconnected as well to lower the power consumption.

Figure 20:
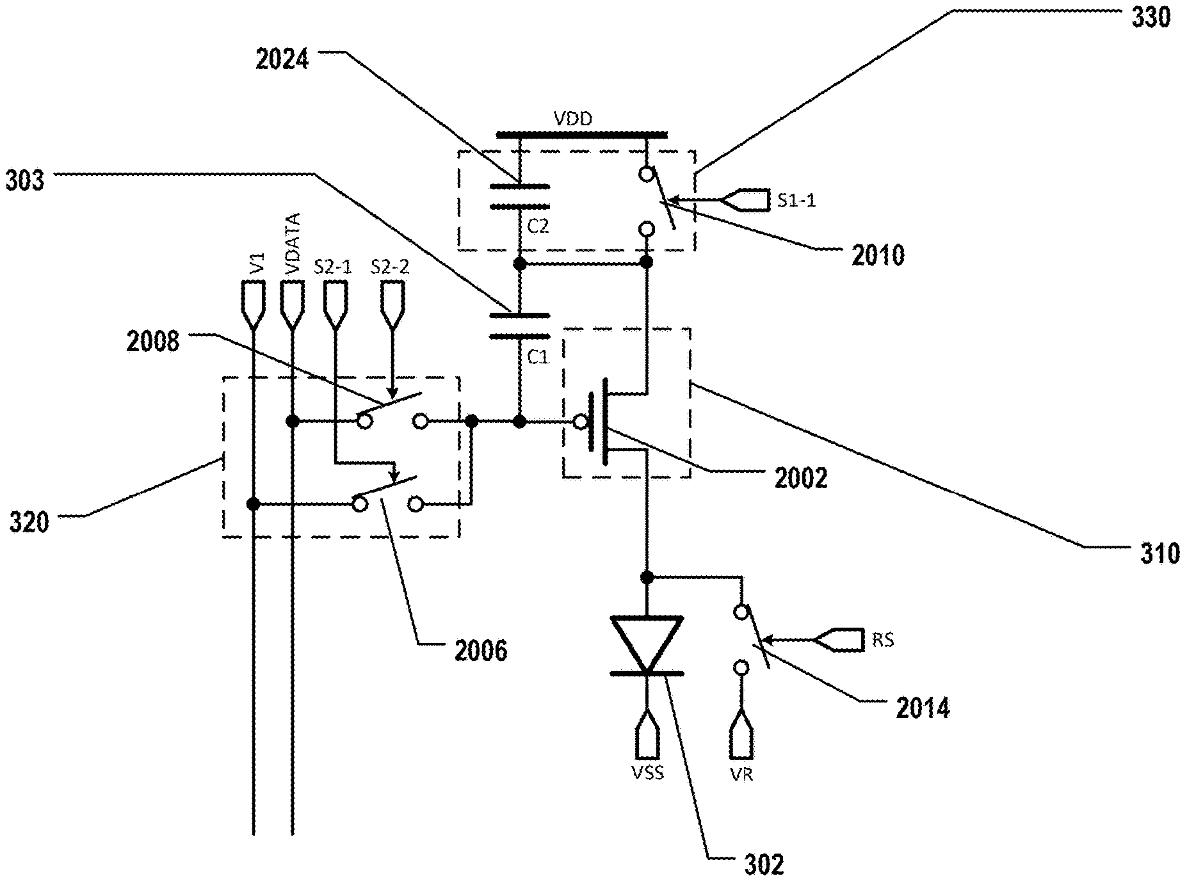
FIG. 20 illustrates a circuit diagram of a pixel driving circuit for a light emitting element, according to some aspects of the present disclosure.
Figure 21:
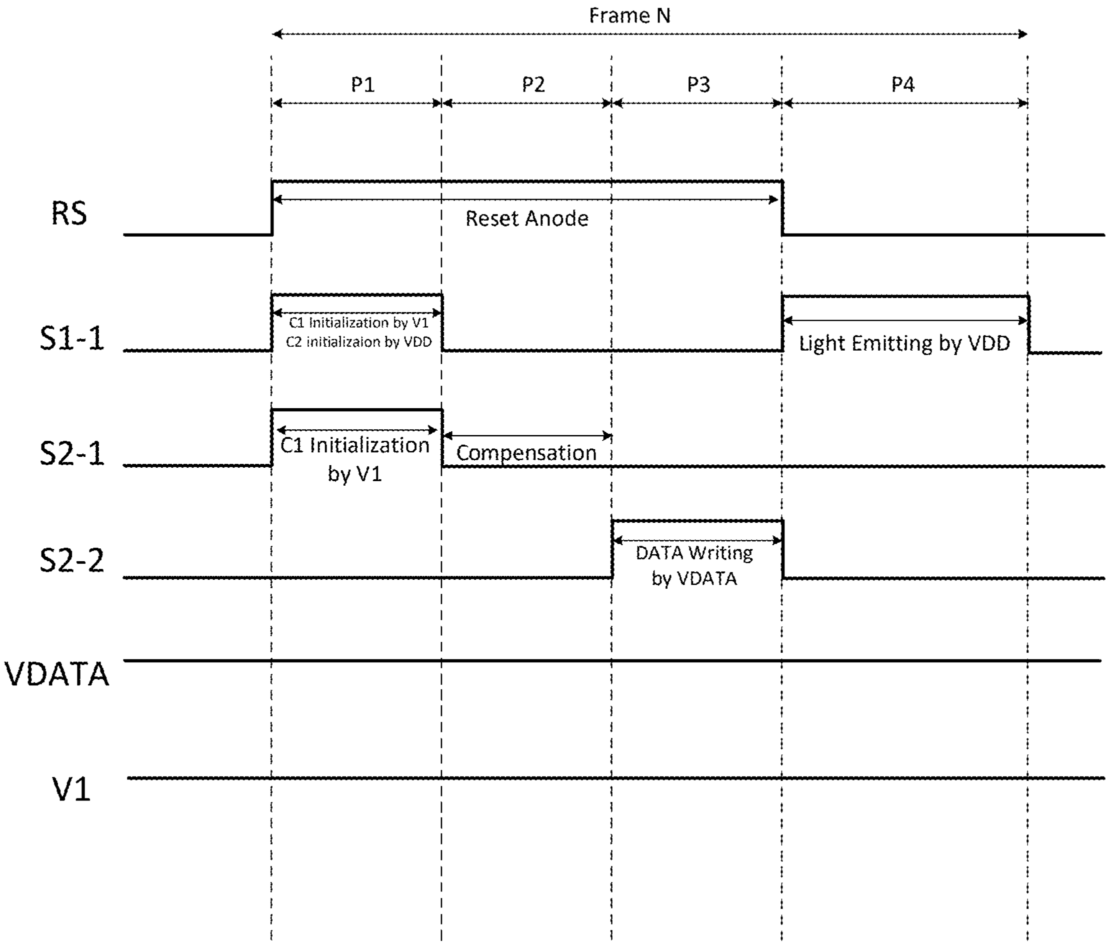
FIG. 21 illustrates a timing diagram showing the operations of the pixel driving circuit in FIG. 20, according to some aspects of the present disclosure.

FIG. 20 illustrates a circuit diagram of a pixel driving circuit 2000 for the light emitting element 302, according to some aspects of the present disclosure. FIG. 21 illustrates a timing diagram showing the operations of the pixel driving circuit 2000 in FIG. 20, according to some aspects of the present disclosure. For the purpose of better describing the present disclosure, the pixel driving circuit 2000 in FIG. 20 and the timing diagram in FIG. 21 will be discussed together. In some implementations, the pixel driving circuit 2000 may be the pixel driving circuit 300 without connecting to an adjacent pixel driving circuit for charge sharing.

As shown in FIG. 20, the driving circuit 310 includes a driving transistor 2002 having a gate terminal, a source terminal, and a drain terminal. The data writing circuit 320 may include a switch 2006 and a switch 2008. The compensation and driving circuit 330 may include a switch 2010 and a capacitor 2024.

The drain terminal of the driving transistor 2002 is coupled to the light emitting element 302, the gate terminal of the driving transistor 2002 is coupled to the first end of the capacitor 303, and the source terminal of the driving transistor 2002 is coupled to the switch 2010, the capacitor 2024, and the second end of the capacitor 303. The switch 2010 is coupled to the second bias source (providing VDD). The capacitor 2024 is also coupled to the second bias source (providing VDD). The switch 2006 is coupled between the first end of the capacitor 303 and the first bias source (providing the first initialization bias signal V1). The switch 2008 is coupled between the first end of the capacitor 303 and the data line (providing the data signal VDATA). The pixel driving circuit 2000 further includes a reset bias source VR and a switch 2014 coupled between the reset bias source VR and the anode of the light emitting element 302.

Compared with the pixel driving circuit 1200, the switch 1204 in the pixel driving circuit 1200 is omitted in the pixel driving circuit 2000.

As shown in FIG. 21, during the initialization period P1, the switches 2006, 2010, and 2014 are turned on (connected), and the switch 2008 is turned off (disconnected). Two ends of the capacitor 303 are initialized by V1 and VDD, and two ends of the capacitor 2024 are initialized by VDD. The anode of the light emitting element 302 is reset by VR. Then, during the compensation period P2, the switch 2014 is turned on (connected), and the switches 2006, 2008, and 2010 are turned off (disconnected). The source terminal of the driving transistor 2002 is compensated by the capacitor 303 and the capacitor 2024. The anode of the light emitting element 302 is reset by VR. During the data writing period P3, the switches 2008 and 2014 are turned on (connected), and the switches 2006 and 2010 are turned off (disconnected). The first end of the capacitor 303 and the gate terminal of the driving transistor 2002 are provided with the data signal VDATA. During the emitting period P4, the switch 2010 is turned on (connected), and the switches 2006, 2008, and 2014 are turned off (disconnected). The light emitting element 302 is driven by VDD to emit.

The data line (providing the data signal VDATA) and the first bias source (providing the first initialization bias signal V1) are separated and provided by two different lines, and the voltage toggle on the data line can also be reduced.

Figure 22:
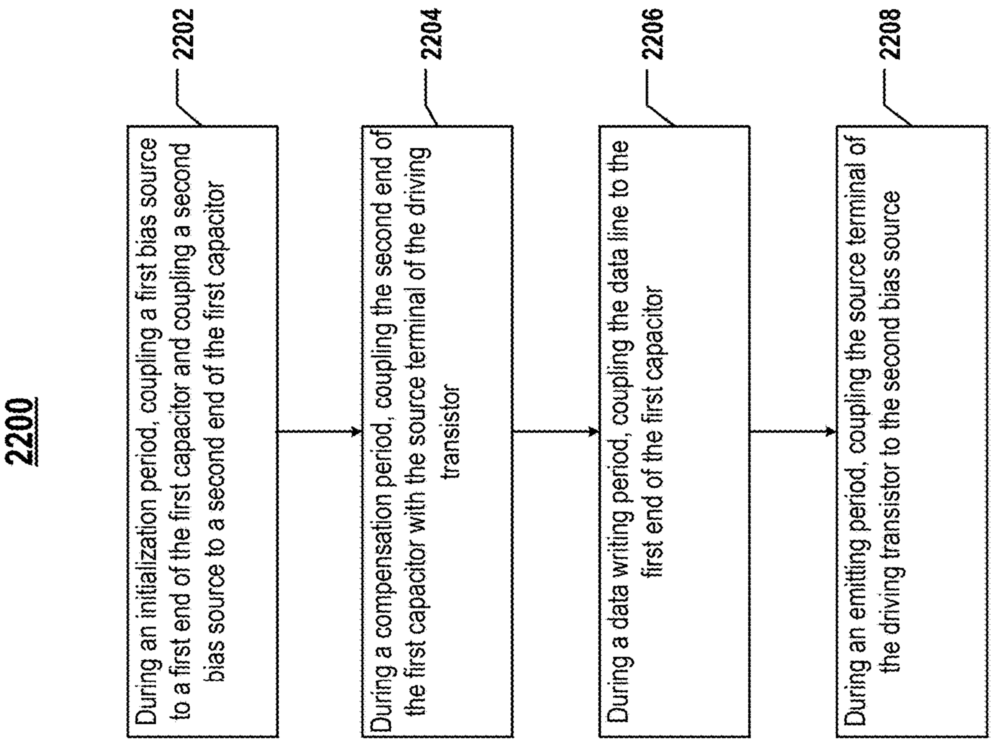
FIG. 22 illustrates a flowchart of a method for driving a light emitting element by a pixel circuit, according to some aspects of the present disclosure.

FIG. 22 illustrates a flowchart of a method 2200 for driving a light emitting element by a pixel circuit, according to some aspects of the present disclosure. The pixel circuit includes a driving circuit, a data writing circuit, and a compensation and driving circuit. The driving circuit includes a driving transistor. The data writing circuit is coupled to a first bias source, a data line, and a gate terminal of the driving transistor. The compensation and driving circuit is coupled to a second bias source and a source terminal of the driving transistor. A first capacitor is disposed between the compensation and driving circuit and the gate terminal of the driving transistor.

As shown in operation 2202 of FIG. 22, during an initialization period, a first bias source (providing the first initialization bias signal V1) is coupled to a first end of the capacitor 303, and a second bias source (providing VDD) is coupled to to a second end of the capacitor 303. In some implementations, the second end of the capacitor 303 is coupled to an adjacent pixel circuit.

As shown in operation 2204 of FIG. 22, during a compensation period, the second end of the capacitor 303 is coupled with the source terminal of the driving transistor 402. The first bias source is disconnected from the first end of the capacitor 303, and the second bias source is disconnected from the second end of the capacitor 303.

As shown in operation 2206 of FIG. 22, during a data writing period, the data line is coupled to the first end of the capacitor 303. The second end of the capacitor 303 is coupled to the source terminal of the driving transistor 402.

As shown in operation 2208 of FIG. 22, during an emitting period, the source terminal of the driving transistor 402 is coupled to the second bias source. The data line is disconnected from the first end of the capacitor 303.

In some implementations, a sum of the initialization period P1, the compensation period P2, the data writing period P3, and the emitting period P4 is a frame period. In some implementations, during the initialization period, a reset bias source is coupled to the light emitting element. During the emitting period, the reset bias source is disconnected from the light emitting element.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described exemplary implementations, but should be defined only in accordance with the following claims and their equivalents.

What is claimed is:

1. A pixel circuit, comprising:

a driving circuit configured to drive a light emitting element based on a data signal, the driving circuit comprising a driving transistor comprising a gate terminal, a source terminal, and a drain terminal;

a data writing circuit coupled to a first bias source and a data line and configured to selectively provide a first initialization bias signal to the driving circuit during an initialization period and provide the data signal to the driving circuit during a data writing period; and a compensation and driving circuit coupled to a second bias source and configured to selectively provide a second initialization bias signal to the driving circuit during the initialization period and provide a driving bias signal during an emitting period, wherein the light emitting element is disconnected from the second initialization bias signal during the initialization period and the data writing period; and wherein the driving circuit comprises a switch coupled between the source terminal of the driving transistor and the compensation and driving circuit.

2. The pixel circuit of claim 1, further comprising:

a first capacitor disposed between the compensation and driving circuit and the gate terminal of the driving transistor.

3. The pixel circuit of claim 1, wherein the data writing circuit is coupled to the gate terminal of the driving transistor.

4. The pixel circuit of claim 3, wherein the data writing circuit comprises a first switch coupled between the first bias source and the gate terminal of the driving transistor, and a second switch coupled between the data line and the gate terminal of the driving transistor.

5. The pixel circuit of claim 1, wherein the compensation and driving circuit is coupled to the gate terminal and the source terminal of the driving transistor.

6. The pixel circuit of claim 5, wherein the compensation and driving circuit comprises a sixth switch coupled between the second bias source and the driving circuit and a seventh switch coupled between an adjacent pixel circuit and the driving circuit.

7. The pixel circuit of claim 5, wherein the compensation and driving circuit comprises an eighth switch coupled between the second bias source and the driving circuit and a second capacitor coupled between the second bias source and the driving circuit.

8. The pixel circuit of claim 1, further comprising:

a ninth switch coupled between the drain terminal of the driving transistor and a reset bias source.

9. A display, comprising:

a light emitting element;

a driving circuit configured to drive the light emitting element based on a data signal, the driving circuit comprising a driving transistor comprising a gate terminal, a source terminal, and a drain terminal;

a data writing circuit coupled to a first bias source and a data line and configured to selectively provide a first initialization bias signal to the driving circuit during an initialization period and provide the data signal to the driving circuit during a data writing period; and a compensation and driving circuit coupled to a second bias source and configured to selectively provide a second initialization bias signal to the driving circuit during the initialization period and provide a driving bias signal during an emitting period, wherein the light emitting element is disconnected from the second initialization bias signal during the initialization period and the data writing period; and wherein the driving circuit comprises a switch coupled between the source terminal of the driving transistor and the compensation and driving circuit.

10. A method for driving a light emitting element by a pixel circuit, wherein the pixel circuit comprises a driving circuit comprising a driving transistor, a data writing circuit coupled to a first bias source, a data line, and a gate terminal of the driving transistor, a compensation and driving circuit coupled to a second bias source and a source terminal of the driving transistor, and a first capacitor disposed between the compensation and driving circuit and the gate terminal of the driving transistor, wherein the method comprises:

during an initialization period, coupling the first bias source to a first end of the first capacitor and coupling the second bias source to a second end of the first capacitor;

during a compensation period, coupling the second end of the first capacitor with the source terminal of the driving transistor, comprising:

disconnecting the first bias source and the first end of the first capacitor, and disconnecting the second bias source and the second end of the first capacitor;

during a data writing period, coupling the data line to the first end of the first capacitor; and during an emitting period, coupling the source terminal of the driving transistor to the second bias source.

11. The method of claim 10, wherein during the initialization period, coupling the first bias source to the first end of the first capacitor and coupling the second bias source to the second end of the first capacitor, comprises:

coupling the second end of the first capacitor to an adjacent pixel circuit.

12. The method of claim 10, wherein during the data writing period, coupling the data line to the first end of the first capacitor, comprises:

disconnecting the second end of the first capacitor and the source terminal of the driving transistor.

13. The method of claim 10, wherein during the emitting period, coupling the source terminal of the driving transistor to the second bias source, comprises:

disconnecting the data line and the first end of the first capacitor.

14. The method of claim 10, wherein a sum of the initialization period, the compensation period, the data writing period, and the emitting period is a frame period.

15. The method of claim 10, further comprising:

during the initialization period, coupling a reset bias source to the light emitting element; and during the emitting period, disconnecting the reset bias source and the light emitting element.

16. A method for driving a light emitting element by a pixel circuit, wherein the pixel circuit comprises a driving circuit comprising a driving transistor, a data writing circuit coupled to a first bias source, a data line, and a gate terminal of the driving transistor, a compensation and driving circuit coupled to a second bias source and a source terminal of the driving transistor, and a first capacitor disposed between the compensation and driving circuit and the gate terminal of the driving transistor, wherein the method comprises:

during an initialization period, coupling the first bias source to a first end of the first capacitor and coupling the second bias source to a second end of the first capacitor;

during a compensation period, coupling a drain terminal of the driving transistor to the light emitting element, comprising:

disconnecting the first bias source and the first end of the first capacitor, and disconnecting the second bias source and the second end of the first capacitor;

during a data writing period, coupling the data line to the first end of the first capacitor; and during an emitting period, coupling the source terminal of the driving transistor to the second bias source.

17. The method of claim 16, wherein during the initialization period, coupling the first bias source to the first end of the first capacitor and coupling the second bias source to the second end of the first capacitor, comprises:

coupling the second end of the first capacitor to an adjacent pixel circuit.

18. The method of claim 16, wherein during the data writing period, coupling the data line to the first end of the first capacitor, comprises:

disconnecting the drain terminal of the driving transistor and the light emitting element.

19. The method of claim 16, wherein during the emitting period, coupling the source terminal of the driving transistor to the second bias source, comprises:

disconnecting the data line and the first end of the first capacitor.

20. The method of claim 19, further comprising:

coupling the drain terminal of the driving transistor to the light emitting element.

21. The method of claim 16, wherein a sum of the initialization period, the compensation period, the data writing period, and the emitting period is a frame period.

22. The method of claim 16, further comprising:

during the initialization period, coupling a reset bias source to the light emitting element; and during the emitting period, disconnect the reset bias source and the light emitting element.

* * * * *